US012572917B2

(12) United States Patent (10) Patent No.: US 12,572,917 B2
Shao et al. (45) Date of Patent: Mar. 10, 2026

(54) PROGRAM FUNCTION TRIGGERING METHOD AND APPARATUS, DEVICE, SYSTEM, MEDIUM, AND PROGRAM PRODUCT

(71) Applicant: TENCENT TECHNOLOGY (SHENZHEN) COMPANY LIMITED, Shenzhen (CN)

(72) Inventors: Shuai Shao, Shenzhen (CN); Jiayu Huang, Shenzhen (CN); Runzeng Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 323 days.

(21) Appl. No.: 18/333,540

(22) Filed: Jun. 13, 2023

(65) Prior Publication Data

US 2023/0325804 A1 Oct. 12, 2023

Related U.S. Application Data

(63) Continuation of application No. PCT/CN2022/116113, filed on Aug. 31, 2022.

(30) Foreign Application Priority Data

Sep. 29, 2021 (CN) .......................... 202111153197.9

(51) Int. Cl.
*G06Q 20/20* (2012.01)
*H04B 5/20* (2024.01)
*H04B 5/70* (2024.01)

(52) U.S. Cl.
CPC ............. *G06Q 20/208* (2013.01); *H04B 5/20* (2024.01); *H04B 5/70* (2024.01)

(58) Field of Classification Search
CPC .. G06Q 20/208; G06Q 20/3278; G06Q 30/02; H04B 5/20; H04B 5/70;
(Continued)

(56) References Cited

U.S. PATENT DOCUMENTS 10,068,221 B1 * 9/2018 Thomas ............... G06Q 20/322
10,475,081 B1 * 11/2019 Walker .................... H04W 4/02
(Continued)

FOREIGN PATENT DOCUMENTS

CN 1423505 A 6/2003
CN 102800002 A 11/2012
(Continued)

OTHER PUBLICATIONS

C. Uttraphan et al 2020 IOP Conf. Ser.: Mater. Sci. Eng. 917 012055 (Year: 2020).*
(Continued)

*Primary Examiner* — Ashford S Hayles
(74) *Attorney, Agent, or Firm* — Anova Law Group, PLLC

(57) ABSTRACT

A program function triggering method and apparatus, a device, a system, a medium, and a program product are provided, which relate to the field of computer communication. The method includes displaying triggering prompt information after a near field message transmitted by a function device is received, a distance between the terminal and the function device being within a near field communication (NFC) range, and the terminal carrying a target application program; receiving a trigger operation on the triggering prompt information, the triggering prompt information triggering a program function that is in the target application program and that is related to the function device; and displaying a function interface of the target application program based on the trigger operation, the (Continued)

function interface displaying content of the program function.

20 Claims, 14 Drawing Sheets

(58) Field of Classification Search
CPC ..... G06F 8/61; G06F 8/65; G06F 8/71; G06F 9/451; H04W 4/02
See application file for complete search history.

(56) References Cited

U.S. PATENT DOCUMENTS

| | | | |
|---|---|---|---|
| 2006/0100925 A1* | 5/2006 | Finaly | G06Q 30/0273 |
| | | | 705/14.69 |
| 2009/0234731 A1* | 9/2009 | Mariotti | G06Q 30/0267 |
| | | | 705/14.1 |
| 2009/0319181 A1* | 12/2009 | Khosravy | G06Q 30/02 |
| | | | 701/532 |
| 2010/0287057 A1* | 11/2010 | Aihara | G06K 7/1095 |
| | | | 705/16 |
| 2011/0010229 A1* | 1/2011 | Ow | G06Q 30/0207 |
| | | | 705/14.1 |
| 2011/0238476 A1* | 9/2011 | Carr | G06Q 30/0207 |
| | | | 705/14.1 |
| 2011/0307931 A1* | 12/2011 | Shuster | G06F 16/78 |
| | | | 725/105 |
| 2012/0022930 A1* | 1/2012 | Brouhard | G06Q 30/0229 |
| | | | 705/14.3 |
| 2012/0022944 A1* | 1/2012 | Volpi | G06Q 30/0207 |
| | | | 705/14.1 |
| 2012/0066049 A1* | 3/2012 | Muthugopalakrishnan | |
| | | | G06Q 30/02 |
| | | | 705/14.26 |
| 2012/0203572 A1* | 8/2012 | Christensen | G06Q 30/02 |
| | | | 705/2 |
| 2012/0310720 A1* | 12/2012 | Balsan | G06Q 30/02 |
| | | | 705/14.26 |
| 2013/0029686 A1* | 1/2013 | Moshfeghi | H04W 4/021 |
| | | | 455/456.1 |
| 2013/0040563 A1 | 2/2013 | Kim et al. | |
| 2013/0041752 A1* | 2/2013 | Crum | G06Q 30/06 |
| | | | 705/14.57 |
| 2013/0073363 A1* | 3/2013 | Boal | G06Q 30/06 |
| | | | 705/14.23 |
| 2013/0073448 A1* | 3/2013 | Wall | G06Q 20/367 |
| | | | 705/39 |
| 2013/0132218 A1* | 5/2013 | Aihara | G07G 1/0081 |
| | | | 705/21 |
| 2013/0185137 A1* | 7/2013 | Shafi | G06Q 30/02 |
| | | | 705/14.35 |
| 2014/0229251 A1* | 8/2014 | Lim | G06Q 30/0252 |
| | | | 705/14.5 |
| 2014/0256251 A1* | 9/2014 | Caceres | H04W 12/084 |
| | | | 455/41.1 |
| 2015/0142562 A1* | 5/2015 | Sheedy | G06Q 30/02 |
| | | | 705/14.53 |
| 2015/0269626 A1* | 9/2015 | Hasson | G06Q 20/3274 |
| | | | 705/14.26 |
| 2016/0142995 A1* | 5/2016 | Shuster | G06Q 30/02 |
| | | | 455/456.1 |
| 2016/0314419 A1* | 10/2016 | White | H04W 4/80 |
| 2017/0289280 A1 | 10/2017 | Wang et al. | |
| 2018/0314536 A1* | 11/2018 | Wang | G06Q 20/326 |
| 2019/0373433 A1* | 12/2019 | Gabriele | G06Q 20/3278 |
| 2021/0174344 A1* | 6/2021 | Fowler | G06Q 20/367 |
| 2021/0216994 A1* | 7/2021 | Sorbello | G06Q 20/4016 |
| 2021/0312424 A1* | 10/2021 | Lee | G06Q 20/3825 |
| 2021/0368316 A1* | 11/2021 | Tiwari | G06Q 20/20 |

FOREIGN PATENT DOCUMENTS

| | | | | |
|---|---|---|---|---|
| CN | 105933863 A | 9/2016 | | |
| CN | 106028262 A | 10/2016 | | |
| CN | 106384235 A | 2/2017 | | |
| CN | 107341653 A | 11/2017 | | |
| CN | 110503572 A | 11/2019 | | |
| CN | 104054100 B | * 7/2021 | | G06Q 30/02 |
| EP | 2557531 A2 | 2/2013 | | |
| KR | 20180111838 A | * 10/2018 | | G06Q 20/322 |
| WO | WO-2013157996 A2 | * 10/2013 | | G06Q 30/02 |
| WO | WO-2016196143 A1 | * 12/2016 | | G06Q 20/08 |

OTHER PUBLICATIONS

The World Intellectual Property Organization (WIPO) International Search Report for PCT/CN2022/116113 Oct. 21, 2022 12 Pages (including translation).

* cited by examiner

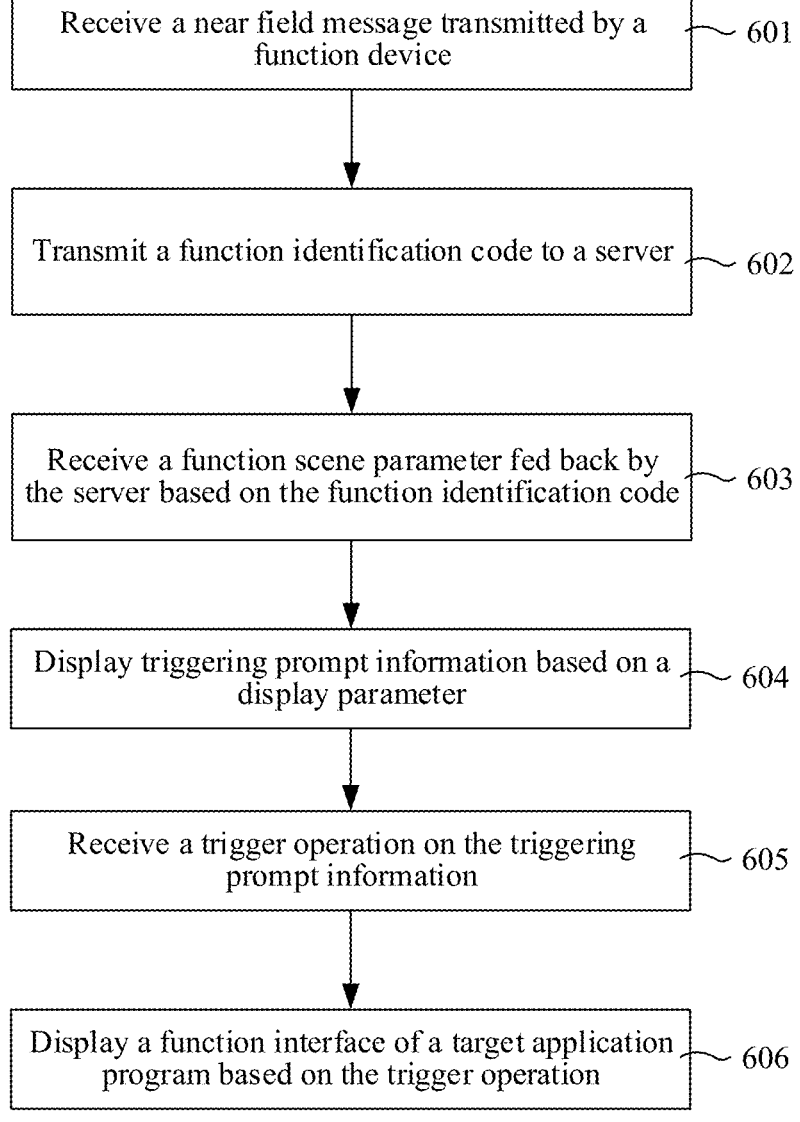

Receive a near field message transmitted by a function device ～601

Transmit a function identification code to a server ～602

Receive a function scene parameter fed back by the server based on the function identification code ～603

Display triggering prompt information based on a display parameter ～604

Receive a trigger operation on the triggering prompt information ～605

Display a function interface of a target application program based on the trigger operation ～606

FIG. 6

| Store location | | Shenzhen | Guangzhou | Beijing |
|---|---|---|---|---|
| UUID 710 | | D1B3EC1F-3925-43D0-80A9-1E34CE5C (Function scene parameter 701) | | |
| Major parameter 720 | | 1 | 2 | 3 |
| Minor parameter 730 | Device 01 | 01 | 01 | 01 |
| | Device 02 | 02 | 02 | 02 |
| | Device 03 | 03 | 03 | 03 |

FIG. 7

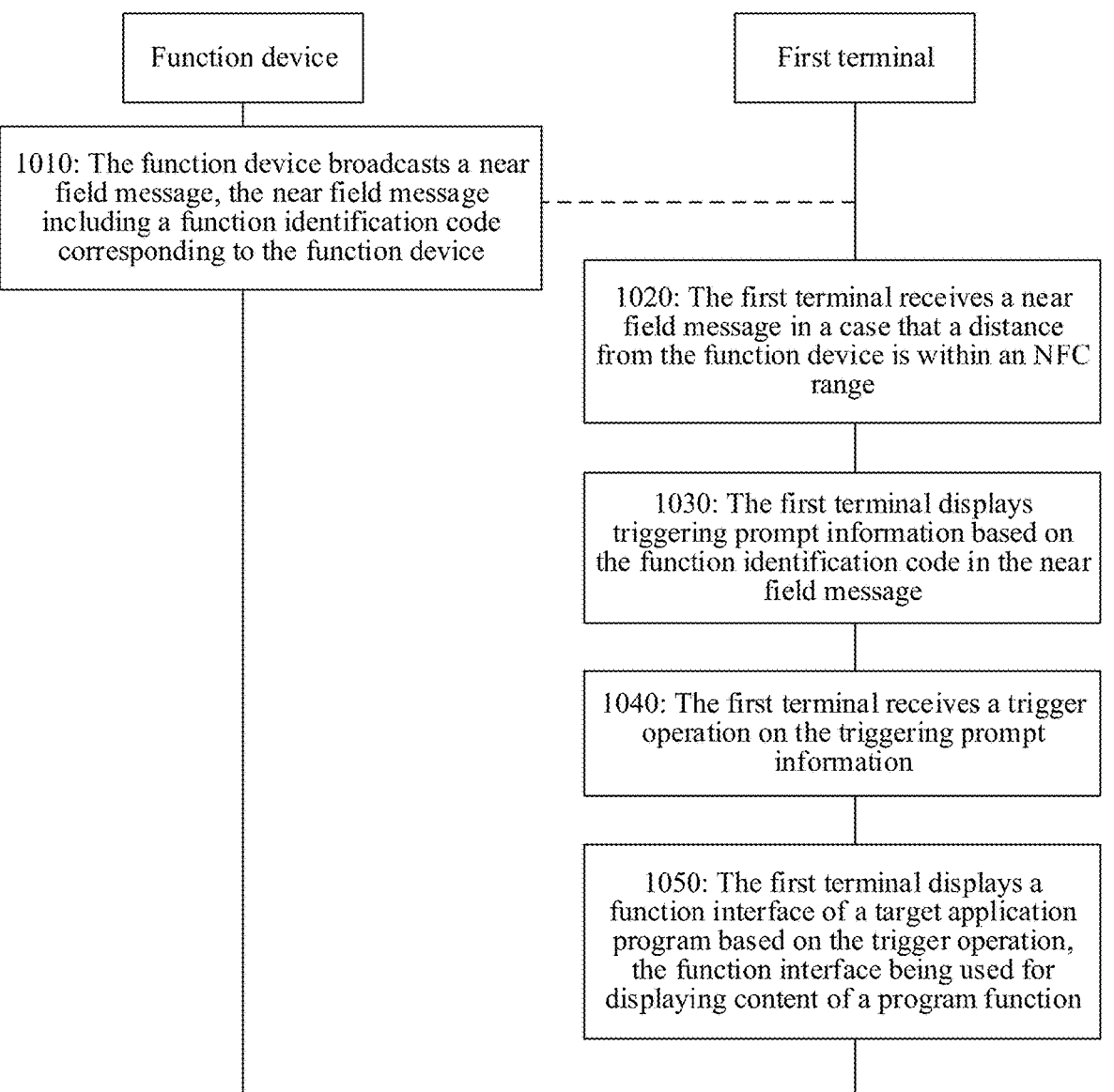

Function device

First terminal

1010: The function device broadcasts a near field message, the near field message including a function identification code corresponding to the function device 1020: The first terminal receives a near field message in a case that a distance from the function device is within an NFC range 1030: The first terminal displays triggering prompt information based on the function identification code in the near field message 1040: The first terminal receives a trigger operation on the triggering prompt information 1050: The first terminal displays a function interface of a target application program based on the trigger operation, the function interface being used for displaying content of a program function

FIG. 10

PROGRAM FUNCTION TRIGGERING METHOD AND APPARATUS, DEVICE, SYSTEM, MEDIUM, AND PROGRAM PRODUCT

RELATED APPLICATIONS

This application is a continuation of PCT Application No. PCT/CN2022/116113, filed on Aug. 31, 2022, which in turn claims priority to Chinese Patent Application No. 202111153197.9, entitled "PROGRAM FUNCTION TRIGGERING METHOD AND APPARATUS, DEVICE, SYSTEM, MEDIUM, AND PROGRAM PRODUCT" filed on Sep. 29, 2021. The two applications are both incorporated herein by reference in their entirety.

FIELD OF THE TECHNOLOGY

Embodiments of this application relate to the field of computer communication, and in particular, to a program function triggering method and apparatus, a device, a system, a medium, and a program product.

BACKGROUND OF THE DISCLOSURE

With continuous extension of an application range for two-dimensional codes, a user often scans a two-dimensional code to pay or open an application interface corresponding to the two-dimensional code in daily life.

In the related art, when the user expects a function interface of a specific application program on a terminal interface, a scanning function in the application program may be used to scan a specified two-dimensional code, thereby displaying the function interface on the terminal interface.

However, the user experience of scanning the specified two-dimensional code to open the function interface is cumbersome and not efficient.

SUMMARY

Embodiments of this application provide a program function triggering method and apparatus, a device, a system, a medium, and a program product. Convenience in an operation in the program function triggering method can be enhanced. The technical solutions are as follows.

One aspect provides a program function triggering method. The method is performed by a terminal. The method includes displaying triggering prompt information after a near field message transmitted by a function device is received, a distance between the terminal and the function device being within a near field communication (NFC) range, and the terminal carrying a target application program; receiving a trigger operation on the triggering prompt information, the triggering prompt information triggering a program function that is in the target application program and that is related to the function device; and displaying a function interface of the target application program based on the trigger operation, the function interface displaying content of the program function.

Another aspect provides a program function triggering system. The system includes a function device and a first terminal. A target application program is installed in the first terminal. The function device is configured to broadcast a near field message, the near field message comprising a function identification code corresponding to the function device. The first terminal is configured to receive the near field message when within a near field communication (NFC) range from the function device, display triggering prompt information based on the function identification code in the near field message, receive a trigger operation on the triggering prompt information, and display a function interface of the target application program based on the trigger operation, the function interface displaying content of the program function.

Another aspect provides a non-transitory computer-readable storage medium. The storage medium stores at least one instruction that is loaded and executed by one or more processors to implement any program function triggering method in the embodiments of this application.

BRIEF DESCRIPTION OF THE DRAWINGS

FIG. 6 is a flowchart of a program function triggering method according to another embodiment of this application.

FIG. 7 shows a function identification code table according to an embodiment of this application.

FIG. 10 is a flowchart of a program function triggering method according to another embodiment of this application.

DESCRIPTION OF EMBODIMENTS

Terms involved in the embodiments of this application are first introduced briefly.

iBeacon technology: an NFC technology, an indoor Bluetooth low energy (BLE) technology. A working mode of the iBeacon technology is that a device with a BLE communication function transmits a distinctive identification code of the device around, and application software receiving the identification code takes some related actions according to the identification code.

Face-scanning device: a hardware device that has a function of scanning a face for facial feature recognition and that is able to complete operations of verification of identity information of a member, payment, and the like.

Desktop cash register: a cash register, a face-scanning device, or the like, which is a product of development of a microelectronic technology and a modern merchandise circulation management concept and technology. A commercial electronic cash register is one of the indispensable electronic devices in modern and automatic commercial management.

Sub-application: an application program that is developed based on a programming language and that runs on a host program, and is an application form between a traditional web page and a traditional application program. A user may run the sub-application in the host program without downloading and installing the sub-application.

Host program: in a computer environment, a software environment that software depends on is referred to as a host environment, and the environment is referred to as a host. In the embodiments of this application, the host program is an application program for providing a running environment for the sub-application. The host program may be an instant messaging application program, a payment application program, a news reading application program, a social application program, or the like that is installed in a personal device, or may be a face-scanning application program, a sign-in application program, or the like that is installed in a shared device.

Figure 1:
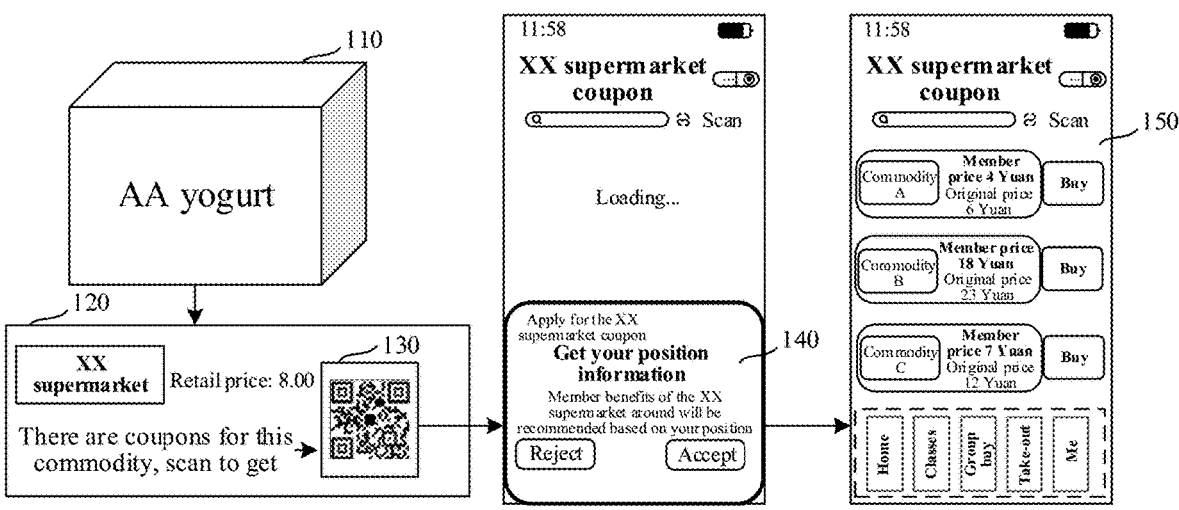
FIG. 1 is a schematic diagram of a related technology according to an embodiment of this application.

In related technology, a function interface of a target application program is often displayed in a terminal by scanning a specified two-dimensional code. Shopping in a store is used as an example. Schematically, refer to FIG. 1. FIG. 1 is a schematic diagram of the related technology according to an embodiment of this application. As shown in FIG. 1, when a merchandise 110 (that is, "AA yogurt") is selected and bought in a store (that is, "XX supermarket"), there is a two-dimensional code of a store sub-application 130 on a paper price tag 120 corresponding to the merchandise 110. The store sub-application 130 is a program running on a host program. When a customer scans and recognizes the two-dimensional code by using a two-dimensional code recognition function in the host program in a terminal, a display request 140 of the store sub-application 130 may be displayed on a current application interface. After the customer selects to agree to enter the store sub-application 130, a function interface 150 in the store sub-application 130 is displayed, including price information of merchandise for sale in the store, preferential policy information of the merchandise in the store, member identity information of the customer, and the like, such that the customer knows about the merchandise, receives coupons to buy related products, and the like. In this solution, the store is required to design and lay a picture of the two-dimensional code of the store sub-application (the two-dimensional code is one of ways for opening the store sub-application), such that the customer scans the two-dimensional code to enter the store sub-application when entering the store for shopping. A medium (that is, scanning the two-dimensional code) is required by the customer to open the store sub-application. This process is complex, and a conversion rate that the customer completes two-dimensional code scanning is low (that is, most customers are unwilling to scan the two-dimensional code of the store). In addition, costs of the store in designing and maintaining the two-dimensional code of the store sub-application are high.

In some embodiments of this application, triggering prompt information is displayed after a near field message transmitted by a function device is received when a distance between a terminal and the function device is within an NFC range, a trigger operation is performed on the triggering prompt information, and a function interface of a target application program installed in the terminal is displayed based on the trigger operation. Therefore, dependence on a bearing medium (for example, creation of a related two-dimensional code of the function interface) is avoided in the step of displaying the function interface in the terminal, and convenience in an operation of triggering a program function is improved.

Applications in the embodiments of this application are exemplified in combination with the above brief descriptions about the terms.

1: In a shopping scene, a function device (for example, a cash register or a face-scanning payment device) is arranged in a store (for example, a supermarket or a convenience store). After a customer enters the store to choose a merchandise, when a distance between a terminal of the customer and the function device is within an NFC range, a display request of a related store sub-application may be displayed on the terminal of the customer (the store sub-application is a program running dependent on a target application program installed in the terminal). When the customer performs a trigger operation on the display request, the current terminal may display an interface of the store sub-application, including prices of merchandise, preferential policies about the merchandise, member information of the customer, and the like, such that the customer completely knows about the merchandise in the store and the preferential policies about the merchandise.

2: In an ordering scene, one or more ordering devices are arranged in a store (for example, a restaurant), and each dining table is tagged with a corresponding serial number. After a customer enters the store, when a distance between a terminal of the customer and the ordering device is within an NFC range, a display request of an ordering sub-application of the store may be displayed on the terminal of the customer (the ordering sub-application is a program running dependent on a target application program installed in the terminal). When the customer performs a trigger operation on the display request, the current terminal may display an interface of the ordering sub-application, and the customer selects a corresponding dining table serial number on the ordering sub-application for ordering according to the dining table serial number corresponding to a seat currently taken by the customer.

3: In a rental scene, power bank rental is used as an example for description. A power bank rental device is often arranged in a supermarket or a store. When a distance between a customer with a terminal and the rental device is within an NFC range, a display request of a power bank rental sub-application may be displayed on the terminal of the customer (the power bank rental sub-application is a program running dependent on a target application program installed in the terminal). When the customer performs a trigger operation on the display request, the current terminal may display an interface of the power bank rental sub-application. The interface includes a position corresponding to a rentable power bank on the device (the position of the power bank displayed in the sub-application corresponds to a position on the power bank rental device). After the customer selects the rentable power bank, and pays a corresponding deposit, the power bank at the corresponding position on the power bank rental device may be ejected for the customer to rent and use.

4: In a smart parking scene, a parking scene is used as an example for description. One or more parking devices are arranged at the entrance of a parking lot. When a vehicle owner stops at the entrance of the parking lot for a short time to enter the parking lot, that is, a distance between a terminal of the vehicle owner and the parking device is within an NFC range, a display request of a parking lot sub-application may be displayed on the terminal of the vehicle owner (the parking lot sub-application is a program running dependent on a target application program installed in the terminal). When the vehicle owner performs a trigger operation on the display request, the current terminal may display an interface of the parking lot sub-application. The interface includes a parking condition of the parking lot, for example, a quantity of available parking spaces and a map distribution of available parking positions, or includes a layout plan of the parking lot, or includes a two-dimensional space environment presentation chart of the parking lot, or the like. Therefore, the vehicle owner may know about the condition of the parking lot, and look for an available parking position.

A program function triggering method provided in the embodiments of this application may be implemented by a terminal, by a server, or collaboratively by a terminal and a server.

When the solution provided in the embodiments of this application is implemented collaboratively by the terminal and the server, the terminal may be connected to the server directly or indirectly in a wired or wireless communication manner. This is not limited to the embodiments of this application.

Figure 2:
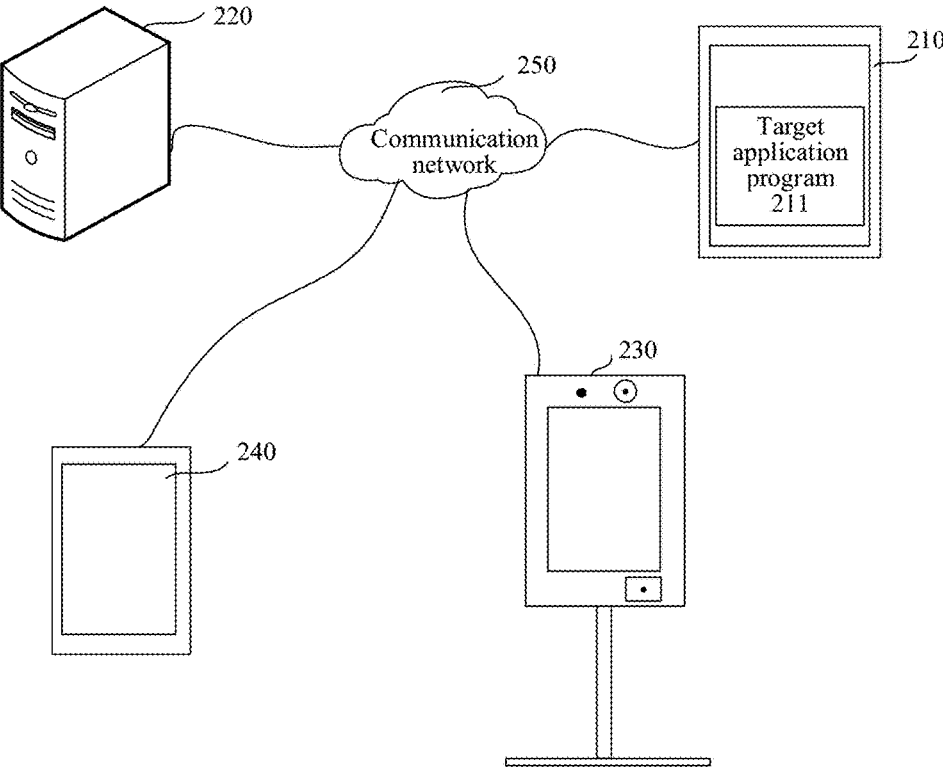
FIG. 2 is a schematic diagram of an implementation environment according to an embodiment of this application.

FIG. 2 is a schematic diagram of an implementation environment according to an embodiment of this application. As shown in FIG. 2, the implementation environment includes a first terminal 210, a server 220, a function device 230, and a second terminal 240. The first terminal 210, the server 220, the function device 230, and the second terminal 240 are connected through a communication network 250.

A target application program 211 is installed in the first terminal 210. The first terminal 210 is a terminal with a Bluetooth function, or a terminal capable of receiving a near field message. The target application program 211 is an application program with a sub-application running function, or an application program with money receiving and payment functions, an ordering function, or the like. This is not limited herein.

The function device 230 is a function device with an NFC function, including a cash register, a face-scanning payment device, an ordering device, a public rental device, and the like. This is not limited herein.

When the distance between the first terminal 210 and the function device 230 is within an NFC range, the first terminal 210 receives the near field message transmitted by the function device 230. The near field message includes a function identification code corresponding to function device 230. The first terminal 210 transmits the received function identification code to the server 220 through the communication network 250. The server 220 recognizes the function identification code to obtain a function scene parameter, the function scene parameter including a display parameter corresponding to triggering prompt information, and feeds back the function scene parameter to the first terminal 210. After receiving the function scene parameter, the first terminal 210 displays the triggering prompt information based on the display parameter in the function scene parameter.

The implementation environment further includes the second terminal 240. An application program capable of updating a configuration parameter of function device 230, including updating the function identification code, is installed in the second terminal 240. The second terminal 240 transmits update data to server 220. After receiving the update data transmitted by the second terminal 240, the server 220 performs parameter modification on the function scene parameter corresponding to the function identification code of the function device 230 (data is modified to the update data transmitted by the second terminal 240), and after completing parameter updating, transmits an update completion response to the second terminal 240. When the first terminal 210 is within the NFC range, the function device 230 transmits updated triggering prompt information to the first terminal 210 through the communication network 250.

The first terminal 210 includes at least one of a smartphone, a tablet computer, a portable laptop, a desktop computer, a smart speaker, a smart wearable device, an in-vehicle terminal, and other terminals.

The second terminal 240 includes at least one of a smartphone, a tablet computer, a portable laptop, a desktop computer, a smart speaker, a smart wearable device, an in-vehicle terminal, and other terminals.

Communication network 250 may be implemented as a wired network or a wireless network. The communication network 250 may be implemented as any one of a local area network, a metropolitan area network, or a wide area network. This is not limited to the embodiments of this application.

The server 220 may be implemented as a cloud server of a cloud.

In some embodiments, server 220 may be implemented as a node in a blockchain system.

In the embodiments of this application, the program function triggering method provided in server 220 is implemented as a business service in an application service layer.

Figure 3:
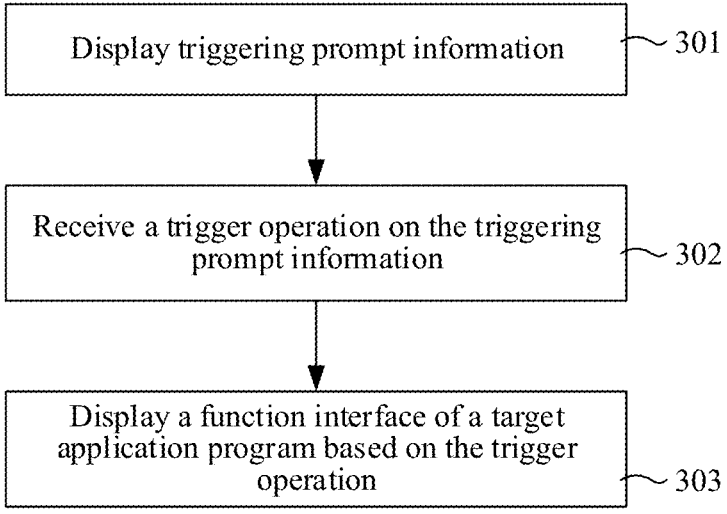
FIG. 3 is a flowchart of a program function triggering method according to an embodiment of this application.

The program function triggering method provided in the embodiments of this application is described in combination with the above brief descriptions about the terms and the application scenes. An example in which the method is performed by a server is used for description. Schematically, refer to FIG. 3. FIG. 3 is a flowchart of the program function triggering method according to an embodiment of this application. The method includes the following steps:

Step 301: Display triggering prompt information.

The triggering prompt information is information displayed after a near field message transmitted by a function device is received when a distance between a current terminal and the function device is within an NFC range. A target application program is installed in the terminal.

In some embodiment, the near field message is a message transmitted by the function device to the terminal within the NFC range. The near field message includes function display content corresponding to the function device, device parameter information of the function device, a sub-application path parameter corresponding to the function device, or the like. This is not limited herein. A sub-application is a program running with the target application program as a host program. In this embodiment of this application, the sub-application is used as an example for description. The sub-application may alternatively be implemented or referred to as an applet, a quick application, or the like. This is not limited.

In some embodiments, the NFC range is an effective range in which the function device transmits the near field message to the terminal. When outside the NFC range, the terminal cannot receive the near field message transmitted by the function device. Schematically, when the terminal within the NFC range moves outside the NFC range, the terminal cancels displaying of the triggering prompt information (that is, the terminal cannot receive the near field message transmitted by the function device).

Schematically, the triggering prompt information includes at least one of the following types of content.

1: The triggering prompt information includes a sub-application display request. That is, the current terminal displays an effect of a pop-up window about the sub-application display request, and the pop-up window includes a name and brief introduction of the sub-application.

2: The triggering prompt information includes an advertisement content pushing request. That is, the current terminal displays an advertisement display request, including a name, specific content, and the like of an advertisement.

3: The triggering prompt information includes a video display request. That is, the current terminal displays the video display request, including a name of a video and brief introduction of video content.

The above descriptions about the triggering prompt information are merely schematic examples. The content of the triggering prompt information is not limited to this embodiment of this application.

In some embodiments, the function device is a mobile device or an immobile device. The function device has an NFC function. That is, within the NFC range, the near field message may be transmitted in a broadcast form to all terminals within the range. The NFC range is an effective range in which the function device transmits the near field message. The near field message includes a function identification code corresponding to the function device, parameter information of the function device, or content of the triggering prompt information. This is not limited herein.

The NFC function is implemented in at least one of the following manners.

1: NFC is implemented by using the iBeacon technology. That is, the function device supports a BLE function in the iBeacon technology. When the function device obtains a position of the terminal, and a distance between the position of the terminal and the function device is within the NFC range, the function device transmits the near field message to the current terminal, and the terminal may display the triggering prompt information.

2: NFC is implemented by using NFC technology. The NFC technology implements non-contact data transmission between the device and the terminal by using a short-range high-frequency wireless communication technology. When the distance between the terminal and the function device is within the NFC range, the terminal may display the triggering prompt information.

The above descriptions about the NFC function are merely schematic examples. The implementation of the NFC function is not limited to this embodiment of this application.

In some embodiments, the target application program is installed in the terminal. In some embodiment, on the premise that the target application program is run in the terminal, when the terminal is within the NFC range, the terminal displays the triggering prompt information. Alternatively, the terminal displays a specified interface of the target application program (the specified interface includes a home screen of the target application program, a resource transfer interface of the target application program, or a dialog box interface of the target application program, and this is not limited herein), and when the terminal is within the NFC range, the terminal displays the triggering prompt information. Alternatively, the target application program is not required to be run in the terminal, and when the terminal is within the NFC range, the terminal may display the triggering prompt information. This is not limited herein.

Step 302: Receive a trigger operation on the triggering prompt information.

The triggering prompt information is used for triggering a program function that is in the target application program and that is related to the function device.

In some embodiments, the trigger operation includes at least one of the following manners.

1: The trigger operation includes a tap operation. That is, an interface on which the triggering prompt information includes a touch control, and the terminal receives a touch operation or a touch-and-hold operation on the touch control.

2: The trigger operation includes a voice instruction. That is, the terminal receives an instruction input in a voice form, the instruction being a specified instruction for triggering the triggering prompt information.

3: The trigger operation includes a motion control operation. That is, motion control is performed on the terminal, for example, the terminal is shaken, the terminal is translated, or the terminal is rotated, and when the terminal receives that a motion status of the current terminal is changed through motion control, the trigger operation is received.

The above descriptions about the trigger operation are merely schematic examples. A specific form of the trigger operation is not limited to this embodiment of this application.

Schematically, the program function related to the function device includes a video playing function, an advertisement display function, a sub-application running function, and the like. This is not limited herein.

In some embodiment, the trigger operation is an operation of triggering displaying of the program function, or an operation of rejecting displaying of the program function. This is not limited herein.

In some embodiments, when the trigger operation is not performed on the triggering prompt information within a specific time range, displaying of the triggering prompt information is canceled; or displaying is not canceled, but is canceled when the distance between the terminal and the function device is outside the NFC range. This is not limited herein.

Step 303: Display a function interface of the target application program based on the trigger operation.

The function interface is used for displaying content of the program function.

In some embodiments, the content of the function interface includes at least one of the following forms:

1: a sub-application interface, using a shop sub-application as an example, including prices of merchandise, preferential policies about the merchandise, member information, and the like;

2: a video playing interface, including video content, a video name, a list of other videos related to the video content, and the like; and 3: an advertising interface, including content pushed by an official account, an advertising slogan, a special advertising effect, and the like.

The above descriptions about the function interface are merely schematic examples. A specific form of the function interface is not limited to this embodiment of this application.

In summary, according to the program function triggering method provided in this embodiment of this application, the target application program is installed in the terminal. When the distance between the terminal and the function device is within the NFC range, the function device transmits the near field message to the terminal, such that the triggering prompt information is displayed on an interface of the terminal. When the terminal receives the trigger operation on the triggering prompt information, the function interface of the target application program is displayed on the terminal. The content of the program function is displayed on the function interface. Displaying the function interface on the terminal by performing the trigger operation on the triggering prompt information displayed on the terminal simplifies an operating process of displaying the function interface, and improves feasibility of the program function triggering method and convenience in the trigger operation.

Figure 4:
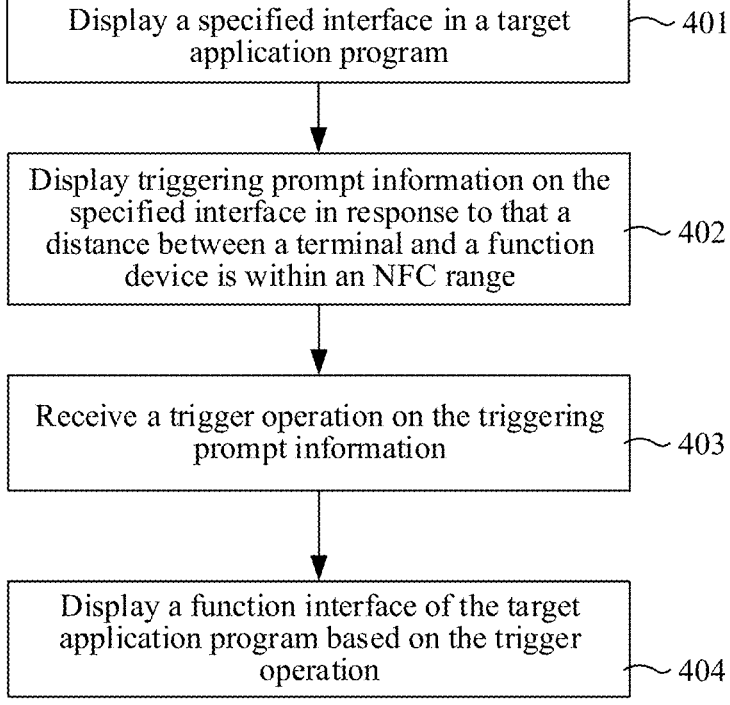
FIG. 4 is a flowchart of a program function triggering method according to another embodiment of this application.

In some embodiments, the function device includes a cash register. Displaying of the triggering prompt information includes displaying on a specified interface of the terminal. Schematically, refer to FIG. 4. FIG. 4 is a flowchart of the program function triggering method according to an embodiment of this application. As shown in FIG. 4, the method includes the following steps:

Step 401: Display the specified interface in the target application program.

The specified interface is a preset interface related to the function device.

Schematically, the specified interface in the target application program includes a home page of the target application program, or an interface related to the function device. The target application program includes one or more specified interfaces. This is not limited herein.

In this embodiment, the function device is the cash register. The resource transfer interface in the target application program is displayed. The resource transfer interface is used for resource collection or payment.

In some embodiment, the resource transfer interface includes a two-dimensional code or barcode carrying identity information of the terminal. The two-dimensional code or the barcode is used for supporting money transfer in a money receiving behavior or a payment behavior.

Step 402: Display the triggering prompt information on the specified interface in response to the distance between the terminal and the function device is within the NFC range.

The NFC range and the triggering prompt information in step 402 have been described in detail in step 301, and will not be elaborated herein.

In this embodiment, the function device transmits the near field message based on the iBeacon technology. In some embodiment, when the distance between the terminal and the function device is within the NFC range, but the terminal does not display the specified interface, the terminal does not display the triggering prompt information. When the distance between the terminal and the function device is within the NFC range, the terminal displays the specified interface, and the terminal displays the triggering prompt information while displaying the specified interface, or displays the triggering prompt information with a delay. When the distance between the terminal and the function device is within the NFC range, if the terminal cancels displaying of the specified interface, the triggering prompt information is canceled simultaneously or with a delay. This is not limited herein.

In some embodiments, the near field message may be a message transmitted based on a short-range wireless communication technology. For example, short-range wireless communication technology may include a wireless fidelity (Wi-Fi) technology, a Bluetooth technology, an NFC technology, a ZigBee technology, and an ultra-wideband technology.

Figure 5:
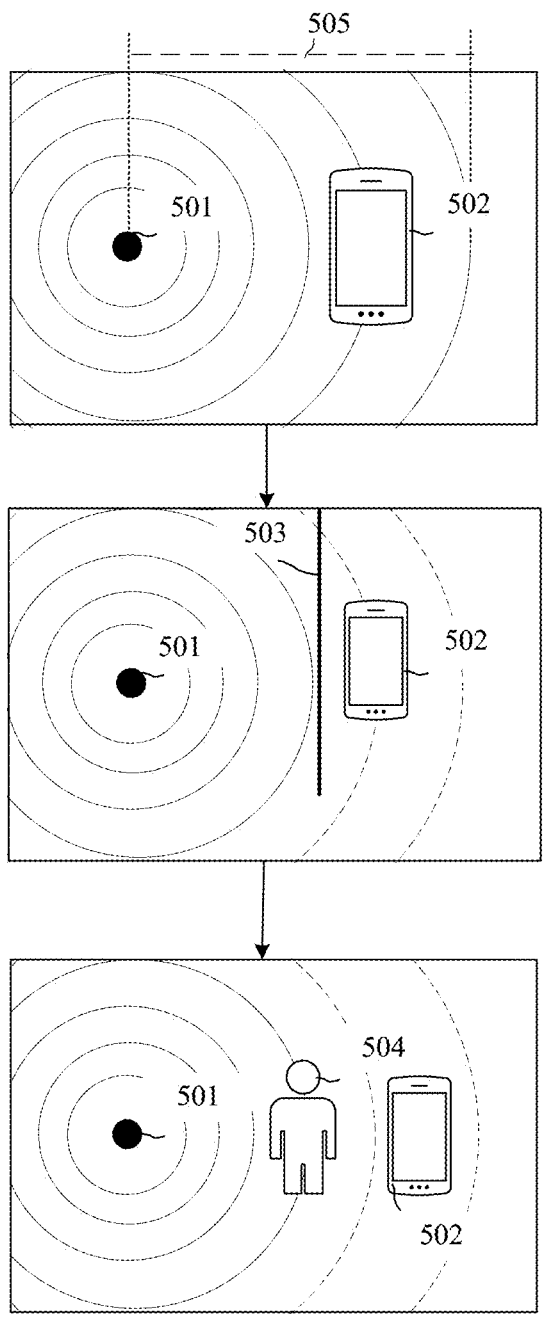
FIG. 5 is a schematic diagram of a display condition of triggering prompt information according to an embodiment of this application.

Schematically, refer to FIG. 5. FIG. 5 is a schematic diagram of a display condition of the triggering prompt information according to an embodiment of this application. As shown in FIG. 5, when a distance between function device 501 and a terminal 502 is within an NFC range 505, the terminal 502 may receive near field information transmitted by the function device 501. That is, the triggering prompt information may be displayed on a specified interface of terminal 502. When a distance between a function device 501 and a terminal 502 is within an NFC range 505, but there is an obstacle 503 (a human body 504 is also regarded as an obstacle) between the function device 501 and the terminal 502, near field information transmitted by the function device 501 may be blocked, and the terminal 502 may or may not receive the near field information transmitted by the function device 501. That is, the triggering prompt information may or may not be displayed on a specified interface of terminal 502. This is not limited. When a distance between terminal 502 and a function device 501 is outside an NFC range 505, the terminal 502 does not display the triggering prompt information (not shown in FIG. 5).

Schematically, when the triggering prompt information is displayed on the specified interface, a display mode includes displaying with the effect of the pop-up window, displaying with an effect of an advertising window, displaying in a form of a dialog box with an inquiry statement, or displaying in a form of a background message. This is not limited herein.

Step 403: Receive the trigger operation on the triggering prompt information.

The triggering prompt information is used for triggering the program function that is in the target application program and that is related to the function device.

In this embodiment, the trigger operation includes the tap operation or the motion control operation. That is, the tap operation on the triggering prompt information is received as the trigger operation. Alternatively, a triggering prompt message is displayed, the triggering prompt message being used for indicating a specified terminal control operation for triggering the triggering prompt information, the motion control operation on the terminal is received, and the motion control operation is determined as the trigger operation in response to that the motion control operation matches the specified terminal control operation.

Schematically, when the trigger operation is the tap operation, and the triggering prompt information is displayed on the specified interface of the terminal, the triggering prompt information is tapped as the trigger operation for triggering the program function. Alternatively, an inquiry dialog box is displayed while the triggering prompt information is displayed, the dialog box being used for determining whether to perform the trigger operation, and the dialog box is tapped as the trigger operation for triggering the program function.

Schematically, when the trigger operation is the motion control operation, and the triggering prompt information is displayed on the specified interface of the terminal, the triggering prompt message (for example, "shake") is displayed simultaneously. After a user shakes the terminal, this operation is determined as the trigger operation for triggering the program function. In some embodiment, a requirement for a quantity of times that the user shakes the terminal may be configured, that is, a threshold of the quantity of times is set, and when the quantity of times that the user shakes the terminal reaches the threshold of the quantity of times, it is determined that the trigger operation for triggering the program function is performed. Alternatively, a requirement for an amplitude at which the user shakes the terminal may be configured, that is, an angle threshold is set, and when an angle by which the user shakes the terminal reaches or exceeds the angle threshold, it is determined that the trigger operation for triggering the function is performed.

Step 404: Display the function interface of the target application program based on the trigger operation.

The function interface is used for displaying the content of the program function.

The content of the function interface in step 404 has been described in detail in step 303, and will not be elaborated herein.

In summary, according to the program function triggering method provided in this embodiment of this application, when the distance between the terminal and the function device is within the NFC range, the terminal may receive the near field message broadcast by the function device, and display the triggering prompt information. The triggering prompt information is used for providing a channel for the terminal to enter the function interface. When the terminal receives the trigger operation on the triggering prompt information, the function interface of the target application program is displayed. The content of the program function is displayed on the function interface. Displaying the function interface on the terminal by performing the trigger operation on the triggering prompt information displayed on the terminal simplifies the operating process of displaying the function interface, and improves the feasibility of the program function triggering method and convenience in the trigger operation.

In this embodiment, displaying the triggering prompt information on the specified interface of the terminal reduces the probability that the triggering prompt information disturbs the user with the terminal. That is, when the terminal displays the specified interface, and the terminal is within the NFC range of the function device, the triggering prompt information is displayed. In addition, displaying the function interface through the tap operation or the motion control operation simplifies the process in which the terminal displays the function interface, and the function interface may be opened only by simply operating the terminal without any other medium, so that convenience in an operation of displaying the function interface is improved.

In some embodiments, the near field message that is received by the terminal and that is transmitted by the function device includes the function identification code corresponding to the function device. Schematically, as shown in FIG. 6, FIG. 6 is a flowchart of the program function triggering method according to an embodiment of this application. As shown in FIG. 6, the method includes the following steps:

Step 601: Receive the near field message transmitted by the function device.

The near field message includes the function identification code corresponding to the function device.

In this embodiment, an example in which the near field message is a message transmitted based on the iBeacon Bluetooth technology is used. The function device broadcasts, within the NFC range based on the iBeacon technology, the function identification code specified by the function device. Schematically, the function identification code is set by the server, and represents a dedicated function parameter of the function device. The function identification code includes at least one of the following several types of content.

1: The function identification code includes a specified serial number of the function device. That is, the function identification code includes code capable of indicating an identity of the function device.

2: The function identification code includes a function scene parameter. That is, the function identification code includes the content of the program function corresponding to the function device.

3: The function identification code includes a function path parameter. That is, the function identification code includes a path parameter capable of instructing displaying of the function interface of the target application program on the terminal.

The above descriptions about the content of the function identification code are merely schematic examples. The specific content of the function identification code is not limited to this embodiment of this application.

Step 602: Transmit the function identification code to the server.

Schematically, after receiving the function identification code transmitted by the function device, the terminal transmits the function identification code to the server for inquiry to further analyze the function identification code, including specifically analyzing the parameter in the function identification code.

Step 603: Receive the function scene parameter fed back by the server based on the function identification code.

The function scene parameter includes a display parameter corresponding to the triggering prompt information.

In some embodiment, the terminal transmits the received function identification code transmitted by the function device to the server for inquiry. The server analyzes the function identification code, and feeds back an obtained analysis result to the terminal. The analysis result includes the display parameter of the function identification code. Schematically, the display parameter is used for indicating display content of the triggering prompt information. Alternatively, the display parameter is used for indicating display duration of the triggering prompt information. Alternatively, the display parameter is used for indicating a special display effect of the triggering prompt information. This is not limited herein.

Schematically, refer to FIG. 7. FIG. 7 shows a function identification code table according to an embodiment of this application. As shown in FIG. 7, the function identification code transmitted based on the iBeacon technology includes a universally unique identifier (UUID) 710, a major parameter 720, and a minor parameter 730 (the major parameter and the minor parameter are configurable parameters for further determining a regional range of the UUID accurately, and are generally set in a form of a serial number). When there is a plurality of function devices in Shenzhen, Guangzhou, and Beijing, a UUID 710, major parameters 720 (for numbering function devices in each city differentially), and minor parameters 730 (for numbering function devices at different positions in the same city differentially) are set for the function devices in these cities. The UUID 710 generally includes function scene parameter 701 of the function device. Each function device corresponds to a different function identification code. That is, each function identification code corresponds to only one function device at a time.

In this embodiment, the server receives and analyzes the function identification code transmitted by the terminal, recognizes the UUID, the major parameter, and the minor parameter to determine a specific position of the function device and the function scene parameter corresponding to the function device, including the display parameter, and feeds back the specific position and the function scene parameter to the terminal.

Step 604: Display the triggering prompt information based on the display parameter.

In some embodiments, the display parameter includes prompt content in the triggering prompt information. The prompt content is content set by an administrator account corresponding to the function device. That is, the prompt content is displayed in the triggering prompt information based on the display parameter.

Schematically, the display parameter that is received by the terminal and that is fed back by the server includes the prompt content in the triggering prompt information. The prompt content includes a name of the program function, or brief introductions to use of the program function, or a triggering prompt message for the program function. This is not limited herein.

In some embodiment, the prompt content in the triggering prompt information is content preset by the administrator account corresponding to the function device. One function device corresponds to one or more administrator accounts. An administrator may modify the prompt content at any time. Modified prompt content may be used for updating when the function device transmits a near field message next time. That is, prompt content received by the terminal within the NFC range from the function device next time is prompt content obtained by the administrator account corresponding to the function device through updating. Schematically, display content of different function devices is the same or different. This is not limited herein.

Step 605: Receive the trigger operation on the triggering prompt information.

The triggering prompt information is used for triggering the program function that is in the target application program and that is related to the function device.

Content of the trigger operation in step 605 has been described in detail in step 302 and step 403, and will not be elaborated herein.

Step 606: Display the function interface of the target application program based on the trigger operation.

The function interface is used for displaying the content of the program function.

In some embodiments, the target application program includes the sub-application. The function scene parameter includes a sub-application path parameter corresponding to the function device. The function interface of the target application program is a running interface of the sub-application. That is, the function interface in a target sub-application is displayed based on the sub-application path parameter and the trigger operation. The target sub-application is a sub-application running with the target application program as a host program.

In some embodiment, after receiving the trigger operation on the triggering prompt information in the terminal, the terminal may display the function interface of the target sub-application, including display content of the target sub-application, a name of the target sub-application, a special display effect of the target sub-application, and the like. This is not limited herein. The target sub-application is a sub-application running dependent on the target application program. That is, when the target application program runs, and the current terminal displays a specified interface of the target application program, the function interface in the target sub-application is displayed on the current terminal based on the trigger operation. When the target application program stops running, the sub-application stops running. Schematically, one target application program includes one or more different target sub-applications, and the target sub-application may run in one or more target application programs. This is not limited herein.

In some embodiments, the function device is a cash register corresponding to a first store, and the target sub-application corresponds to the first store. That is, a store activity interface in the target sub-application is displayed based on the trigger operation, the store activity interface including activity information of the first store. Alternatively, a cash collection interface in the target sub-application is displayed based on the trigger operation, the cash collection interface including a graphic identification code for resource exchange, and the cash register being configured to scan the graphic identification code to implement a cash collection process. That is, the graphic identification code is used for the cash register to scan to implement the cash collection process.

Figure 8:
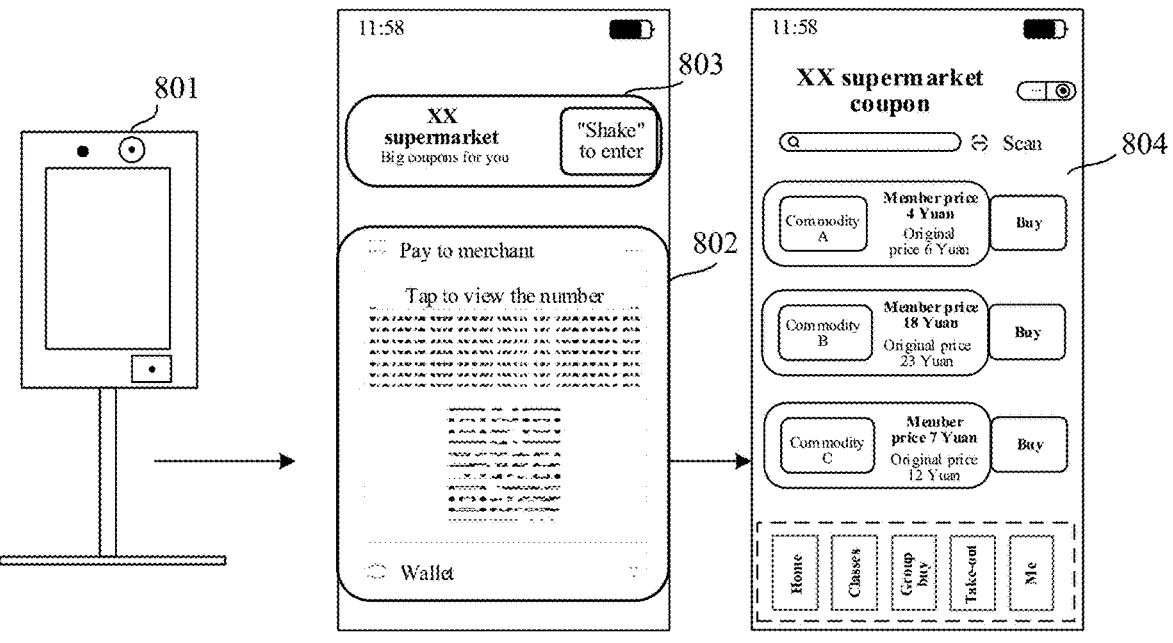
FIG. 8 is a schematic diagram of triggering a program function in a cash collection scene according to an embodiment of this application.

Schematically, refer to FIG. 8. FIG. 8 is a schematic diagram of triggering the program function in a cash collection scene according to an embodiment of this application. As shown in FIG. 8, after the terminal receives a near field message transmitted by a function device 801, triggering prompt information 803 (that is, "XX supermarket, big coupons for you") is displayed on a specified interface 802 (that is, a payment interface) of the current terminal. The triggering prompt information 803 includes a triggering prompt message (that is, "Shake" to enter). After the terminal receives the trigger operation (that is, receives a shaking operation on the terminal), a sub-application activity interface 804 of the XX supermarket is displayed on the current terminal based on the trigger operation. The sub-application activity interface 804 includes activity information of the XX supermarket, for example, for example, a member price and an original price of a merchandise A, or a member price and an original price of a merchandise B.

Figure 9:
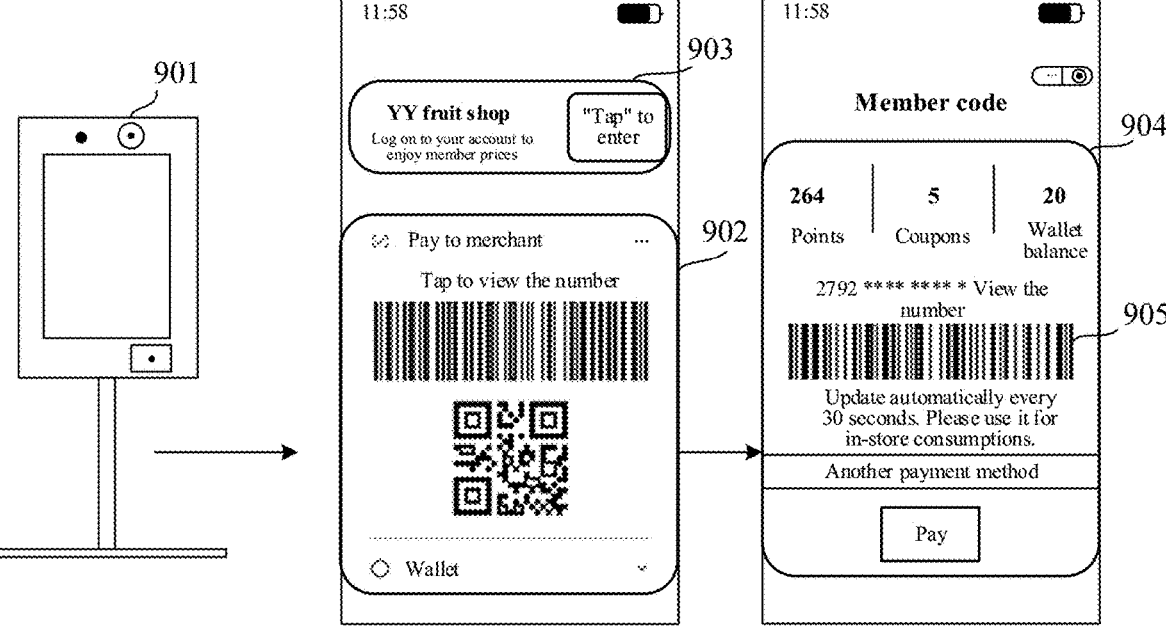
FIG. 9 is a schematic diagram of triggering a program function in a cash collection scene according to another embodiment of this application.

In some embodiment, refer to FIG. 9. FIG. 9 is a schematic diagram of triggering the program function in a cash collection scene according to another embodiment of this application. As shown in FIG. 9, after the terminal receives a near field message transmitted by a function device 901, triggering prompt information 903 (that is, "YY fruit shop, log on to your member account to enjoy member prices") is displayed on a specified interface 902 (that is, a payment interface) of the current terminal. The triggering prompt information 903 includes "Tap to enter" (that is, when the operation is a tap operation, the tap operation is used as a trigger operation of triggering displaying of the function interface of the sub-application). After the terminal receives the trigger operation, the tap operation is determined as the trigger operation, and a cash collection interface 904 of the YY fruit shop is displayed on the current terminal based on the trigger operation. The cash collection interface 904 includes a specific barcode 905 of a current subprogam account. The barcode is used for performing a payment operation in the YY fruit shop. The cash collection interface 904 further includes member information (for example, member points, a quantity of coupons, or a wallet balance of the member) of the account logging on to the sub-application of the YY fruit shop.

In some embodiments, the function device is an ordering device corresponding to a second store, and the target sub-application corresponds to the second store. That is, an ordering interface in the target sub-application is displayed based on the trigger operation. The ordering interface includes candidate merchandise information provided by the second store. Schematically, an example in which the function device is an ordering device of a specific restaurant is used as an example. The target sub-application is an ordering sub-application of the restaurant. When the terminal receives the trigger operation on the triggering prompt information, the current terminal displays an ordering sub-application interface of the restaurant. The ordering sub-application interface includes information about dishes for sale in the restaurant, including prices of the dishes, real product pictures of the dishes, raw materials and cooking methods of the dishes, and the like. This is not limited herein.

In some embodiments, the function device is a rental device corresponding to a third store, and the target sub-application corresponds to the third store. That is, a rental interface in the target sub-application is displayed based on the trigger operation. The rental interface includes candidate to-be-rented product information provided by the third store. Schematically, an example in which the function device is a power bank rental device is used. The power bank rental device includes a plurality of rentable power banks. The target sub-application is a rental sub-application of the power bank rental device. When the terminal receives the trigger operation on the triggering prompt information, the current terminal displays a rental sub-application interface of the power bank rental device. The rental sub-application interface displays whether the power banks in the power bank rental device are rentable, including a specific position of a rentable power bank in the power bank rental device, a power condition of each power bank, or the like. This is not limited herein.

In summary, according to the program function triggering method provided in this embodiment of this application, when the distance between the terminal and the function device is within the NFC range, the terminal may receive the near field message broadcast by the function device, and display the triggering prompt information. The triggering prompt information is used for providing a channel for the terminal to enter the function interface. When the terminal receives the trigger operation on the triggering prompt information, the function interface of the target application program is displayed. The content of the program function is displayed on the function interface. Displaying the function interface on the terminal by performing the trigger operation on the triggering prompt information displayed on the terminal simplifies the operating process of displaying the function interface, and improves the feasibility of the program function triggering method and convenience in the trigger operation.

In this embodiment, the function identification code transmitted by the function device is received and transmitted to the server, and the function scene parameter fed back by the server is received, thereby displaying the triggering prompt information. This improves accuracy of transmitting the near field message by the function device. In addition, displaying of the function interface of the target application program may be applied to a plurality of scene conditions, so that practicability and popularization feasibility of the program function triggering method are improved.

In some embodiments, a program function triggering system includes a function device and a first terminal. A target application program is installed in the first terminal. As shown in FIG. 10, FIG. 10 is a flowchart of the program function triggering method according to another embodiment of this application. As shown in FIG. 10, the method includes the following steps:

Step 1010: The function device broadcasts a near field message, the near field message including a function identification code corresponding to the function device.

In some embodiment, the near field message is a message transmitted by the function device to the first terminal within an NFC range. The near field message includes function display content corresponding to the function device, device parameter information of the function device, a sub-application path parameter corresponding to the function device, or the like. This is not limited herein.

In some embodiments, the function device is a mobile device or an immobile device. The function device has an NFC function. That is, within the NFC range, the near field message may be transmitted to the first terminal within the range. The NFC range is an effective range in which the function device transmits the near field message. The near field message includes the function identification code corresponding to the function device, parameter information of the function device, or content of triggering prompt information. This is not limited herein.

Descriptions about content of the function identification code may refer to the descriptions in step 601, and elaborations are omitted herein.

Step 1020: The first terminal receives the near field message when a distance from the function device is within the NFC range.

In some embodiments, the NFC range is the effective range in which the function device transmits the near field message to the terminal. When outside the NFC range, the terminal cannot receive the near field message transmitted by the function device. Schematically, when the terminal within the NFC range moves outside the NFC range, the terminal cancels displaying of the triggering prompt information (that is, the terminal cannot receive the near field message transmitted by the function device).

Step 1030: The first terminal displays the triggering prompt information based on the function identification code in the near field message.

The triggering prompt information is used for triggering a program function that is in a target application program and that is related to the function device. Schematically, the triggering prompt information includes at least one of the following types of content.

1: The triggering prompt information includes a sub-application display request. That is, the current terminal displays an effect of a pop-up window about the sub-application display request, and the pop-up window includes a name and brief introduction of a sub-application.

2: The triggering prompt information includes an advertisement content pushing request. That is, the current terminal displays an advertisement display request, including a name, specific content, and the like of an advertisement.

3: The triggering prompt information includes a video display request. That is, the current terminal displays the video display request, including a name of a video and brief introduction of video content.

The above descriptions about the triggering prompt information are merely schematic examples. The content of the triggering prompt information is not limited to this embodiment of this application.

Step 1040: The first terminal receives a trigger operation on the triggering prompt information.

The triggering prompt information is used for triggering the program function that is in the target application program and that is related to the function device.

In some embodiments, the trigger operation includes at least one of the following manners.

1: The trigger operation includes a tap operation. That is, an interface on which the triggering prompt information includes a touch control, and the terminal receives a touch operation or a touch-and-hold operation on the touch control.

2: The trigger operation includes a voice instruction. That is, the terminal receives an instruction input in a voice form, the instruction being a specified instruction for triggering the triggering prompt information.

3: The trigger operation includes a motion control operation. That is, motion control is performed on the terminal, for example, the terminal is shaken, the terminal is translated, or the terminal is rotated, and when the terminal receives that a motion status of the current terminal is changed through motion control, the trigger operation is received.

The above descriptions about the trigger operation are merely schematic examples. A specific form of the trigger operation is not limited to this embodiment of this application.

Step 1050: The first terminal displays a function interface of the target application program based on the trigger operation, the function interface being used for displaying content of the program function.

Schematically, the program function related to the function device includes a video playing function, an advertisement display function, a sub-application running function, and the like. This is not limited herein.

In some embodiment, the trigger operation is an operation of triggering displaying of the program function, or an operation of rejecting displaying of the program function. This is not limited herein.

In some embodiments, when the trigger operation is not performed on the triggering prompt information within a specific time range, displaying of the triggering prompt information is canceled; or displaying is not canceled, but is canceled when the distance between the first terminal and the function device is outside the NFC range. This is not limited herein.

In summary, according to the program function triggering method provided in this embodiment of this application, when the distance between the terminal and the function device is within the NFC range, the terminal may receive the near field message broadcast by the function device, and display the triggering prompt information. The triggering prompt information is used for providing a channel for the terminal to enter the function interface. When the terminal receives the trigger operation on the triggering prompt information, the function interface of the target application program is displayed. The content of the program function is displayed on the function interface. Displaying the function interface on the terminal by performing the trigger operation on the triggering prompt information displayed on the terminal simplifies an operating process of displaying the function interface, and improves feasibility of the program function triggering method and convenience in the trigger operation.

Figure 11:
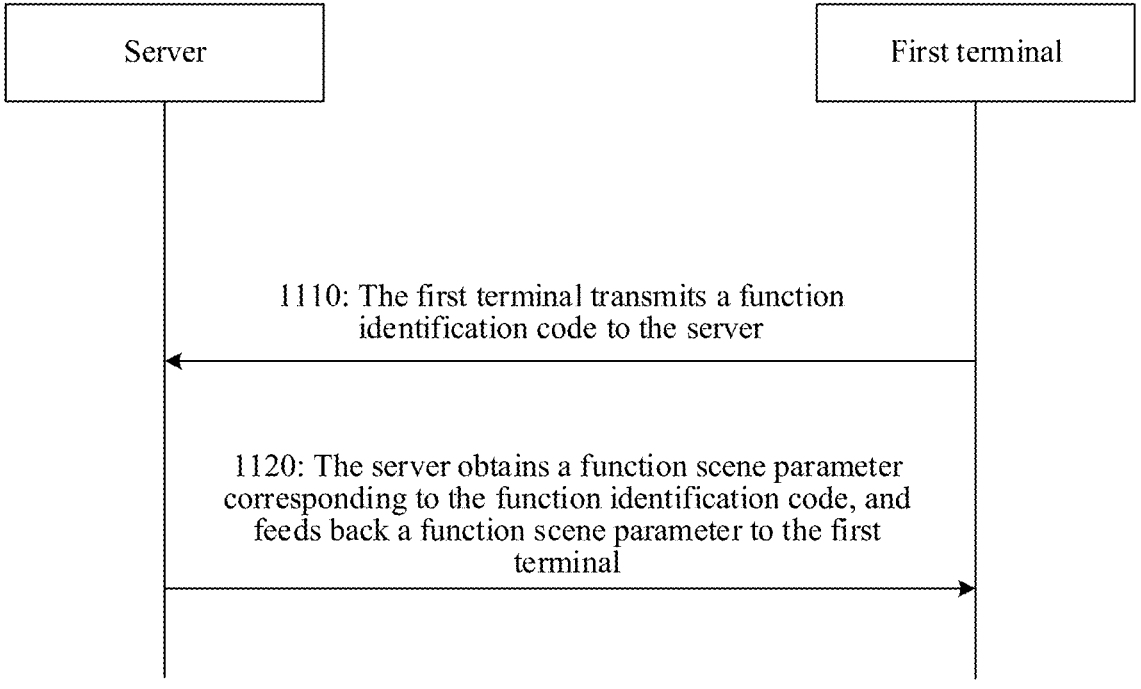
FIG. 11 is a flowchart of a program function triggering method according to another embodiment of this application.

In some embodiments, the program function triggering system further includes a server. As shown in FIG. 11, FIG. 11 is a flowchart of the program function triggering method according to another embodiment of this application. As shown in FIG. 11, the method includes the following steps:

Step 1110: The first terminal transmits the function identification code to the server.

Schematically, after receiving the function identification code transmitted by the function device, the first terminal transmits the function identification code to the server for inquiry to further analyze the function identification code, including specifically analyzing a parameter in the function identification code.

Step 1120: The server obtains a function scene parameter corresponding to the function identification code, and feeds back the function scene parameter to the first terminal.

The function scene parameter includes a display parameter corresponding to the triggering prompt information.

In some embodiment, the first terminal transmits the received function identification code transmitted by the function device to the server for inquiry. The server analyzes the function identification code, and feeds back an obtained analysis result to the first terminal. The analysis result includes the display parameter of the function identification code. Schematically, the display parameter is used for indicating display content of the triggering prompt information. Alternatively, the display parameter is used for indicating display duration of the triggering prompt information. Alternatively, the display parameter is used for indicating a special display effect of the triggering prompt information. This is not limited herein.

In summary, according to the program function triggering method provided in this embodiment of this application, when the distance between the terminal and the function device is within the NFC range, the terminal may receive the near field message broadcast by the function device, and display the triggering prompt information. The triggering prompt information is used for providing a channel for the terminal to enter the function interface. When the terminal receives the trigger operation on the triggering prompt information, the function interface of the target application program is displayed. The content of the program function is displayed on the function interface. Displaying the function interface on the terminal by performing the trigger operation on the triggering prompt information displayed on the terminal simplifies an operating process of displaying the function interface, and improves feasibility of the program function triggering method and convenience in the trigger operation.

Figure 12:
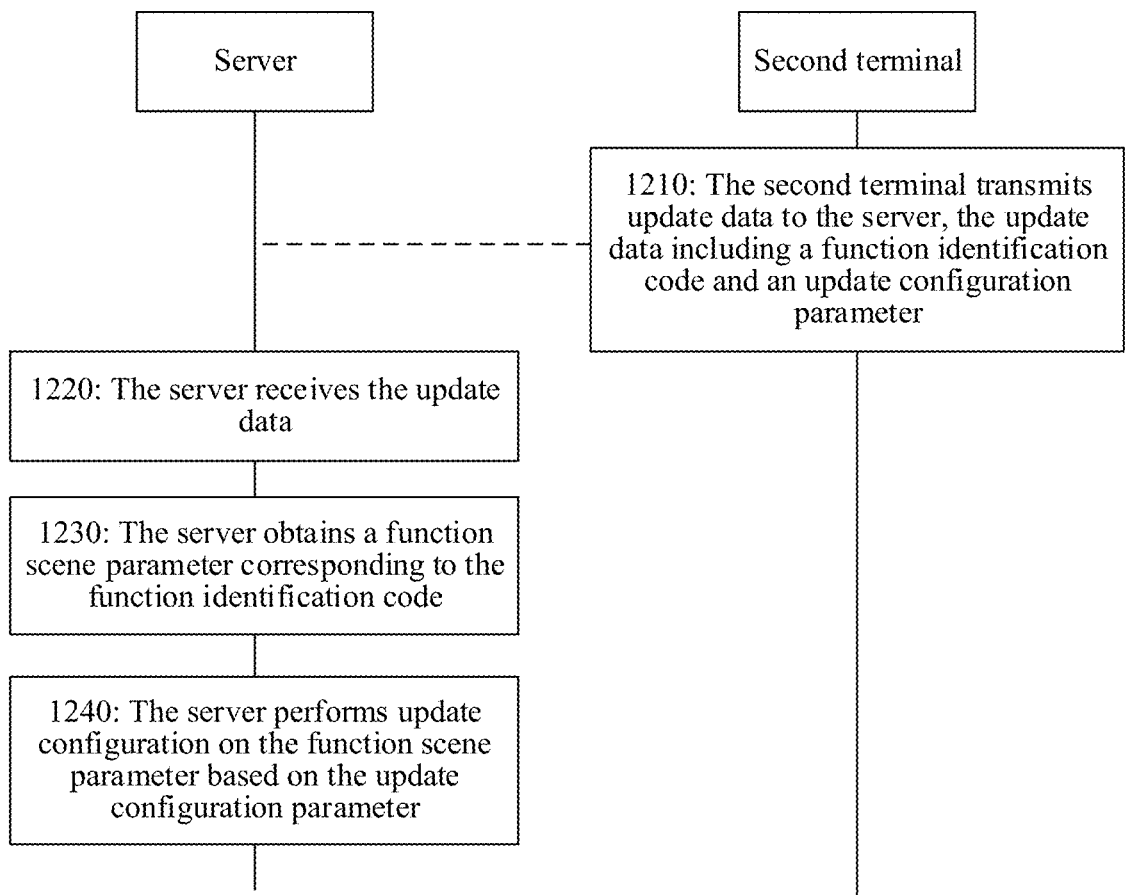
FIG. 12 is a flowchart of a program function triggering method according to another embodiment of this application.

In some embodiments, the program function triggering system further includes a second terminal. As shown in FIG. 12, FIG. 12 is a flowchart of the program function triggering method according to another embodiment of this application. As shown in FIG. 12, the method includes the following steps:

Step 1210: The second terminal transmits update data to the server, the update data including the function identification code and an update configuration parameter.

Schematically, the second terminal is provided with a management application program for managing the function device. An administrator account is run in the application program. An administrator account may update, by using the management application program, a configuration in the function device corresponding to the administrator account, including modifying a configuration parameter in the function identification code in the near field message, and transmit updated data to the server.

Step 1220: The server receives the update data.

Content about the server and the update data in step 1220 has been specifically described in step 1210, and will not be elaborated herein.

Step 1230: The server obtains the function scene parameter corresponding to the function identification code.

In this embodiment, after obtaining the function scene parameter corresponding to the function identification code, the server stores the function scene parameter.

Figure 13:
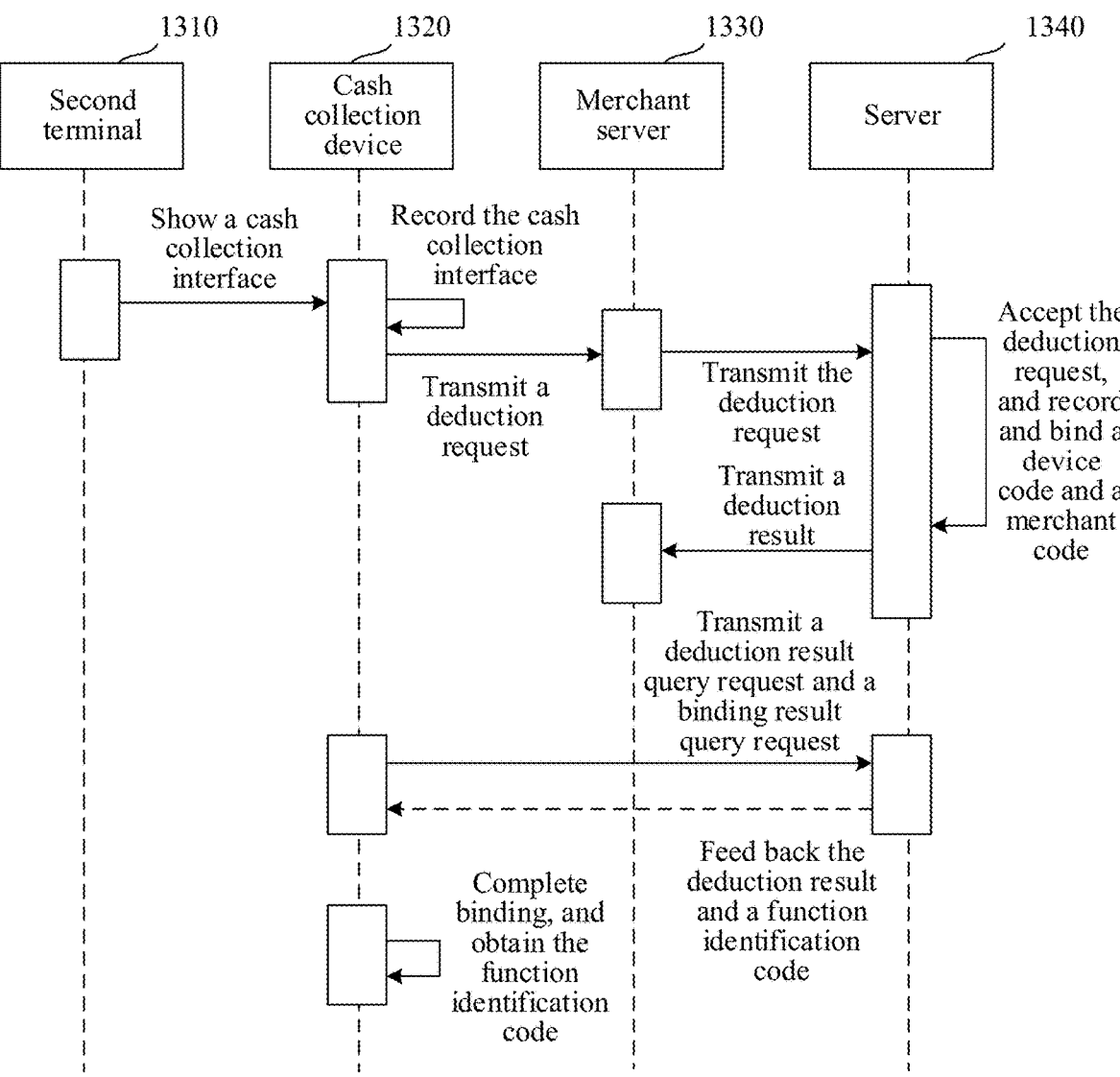
FIG. 13 is a schematic diagram in which a server obtains a function scene parameter for the first time according to an embodiment of this application.

When obtaining the function scene parameter corresponding to the function device for the first time, the server is required to complete a specified operation on a specified interface of the target application program through the second terminal (or the first terminal when necessary) to obtain the function scene parameter. An example in which the function device is a cash register is used. Schematically, as shown in FIG. 13, FIG. 13 is a schematic diagram in which the server obtains the function scene parameter for the first time according to an embodiment of this application. As shown in FIG. 13, the target application program is installed in a second terminal 1310. The specified interface of the target application program is a cash collection interface in the target application program (the cash collection interface includes a two-dimensional code or barcode for receiving money). The cash collection interface is shown to a cash register 1320 (the cash register is a device corresponding to a store). The cash register 1320 records the cash collection interface, and transmits a deduction request to a store server 1330. The store server 1330 receives the deduction request, and transmits the deduction request to a server 1340. The server 1340 accepts the deduction request, records a device code corresponding to the cash register 1320 and a store code corresponding to the store server 1330, and transmits a deduction result to the store server. After the store server 1330 transmits the deduction request from the cash register 1320 for the first time, the server 1340 binds the device code corresponding to the cash register 1320 with the store code corresponding to the store server 1330, obtains a function scene parameter corresponding to the cash register 1320, and generates a function identification code corresponding to the cash register 1320 based on the function scene parameter. When the cash register 1320 transmits a deduction result query request and a binding result query request to the server 1340, the server 1340 sends back the deduction result and the function identification code to the cash register 1320. The cash register 1320 completes binding, and obtains the function identification code.

Step 1240: The server performs update configuration on the function scene parameter based on the update configuration parameter.

In this embodiment, the function device transmits an inquiry request to the server at specific time intervals (configurable) to request for a configuration updating condition of the function scene parameter in the function device. The server transmits an update result to the function device to perform update configuration on the function scene parameter.

Figure 14:
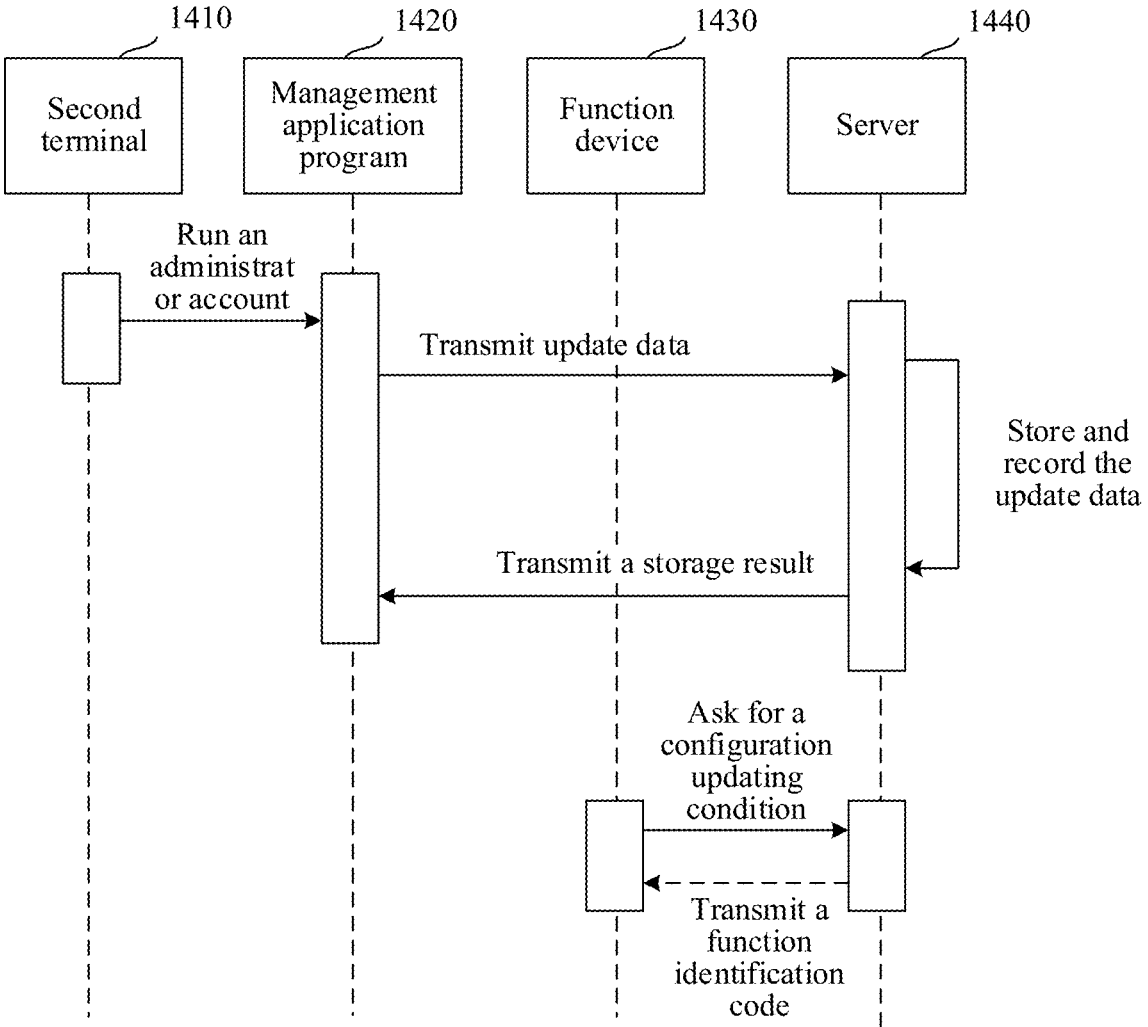
FIG. 14 is a schematic diagram of update configuration of a function device according to an embodiment of this application.

Schematically, refer to FIG. 14. FIG. 14 is a schematic diagram of update configuration of the function device according to an embodiment of this application. As shown in FIG. 14, a management application program 1420 in a second terminal 1410 runs an administrator account (the management application program is a program used by an administrator to manage and configure the program function of the target application program), and performs configuration updating on a function scene parameter of the function device 1430. The management application program 1420 transmits update data to a server 1440. The server 1440 stores and records the update data, generates a new function identification code based on the update data, and transmits a storage result to the management application program 1420. The function device 1430 asks the server 1440 for a configuration updating condition at specific time intervals (configurable). The server 1440 transmits the latest updated function identification code to the function device 1430 to perform update configuration on the function identification code of the function device 1430.

In summary, according to the program function triggering method provided in this embodiment of this application, when the distance between the terminal and the function device is within the NFC range, the terminal may receive the near field message broadcast by the function device, and display the triggering prompt information. The triggering prompt information is used for providing a channel for the terminal to enter the function interface. When the terminal receives the trigger operation on the triggering prompt information, the function interface of the target application program is displayed. The content of the program function is displayed on the function interface. Displaying the function interface on the terminal by performing the trigger operation on the triggering prompt information displayed on the terminal simplifies the operating process of displaying the function interface, and improves the feasibility of the program function triggering method and convenience in the trigger operation.

Figure 15:
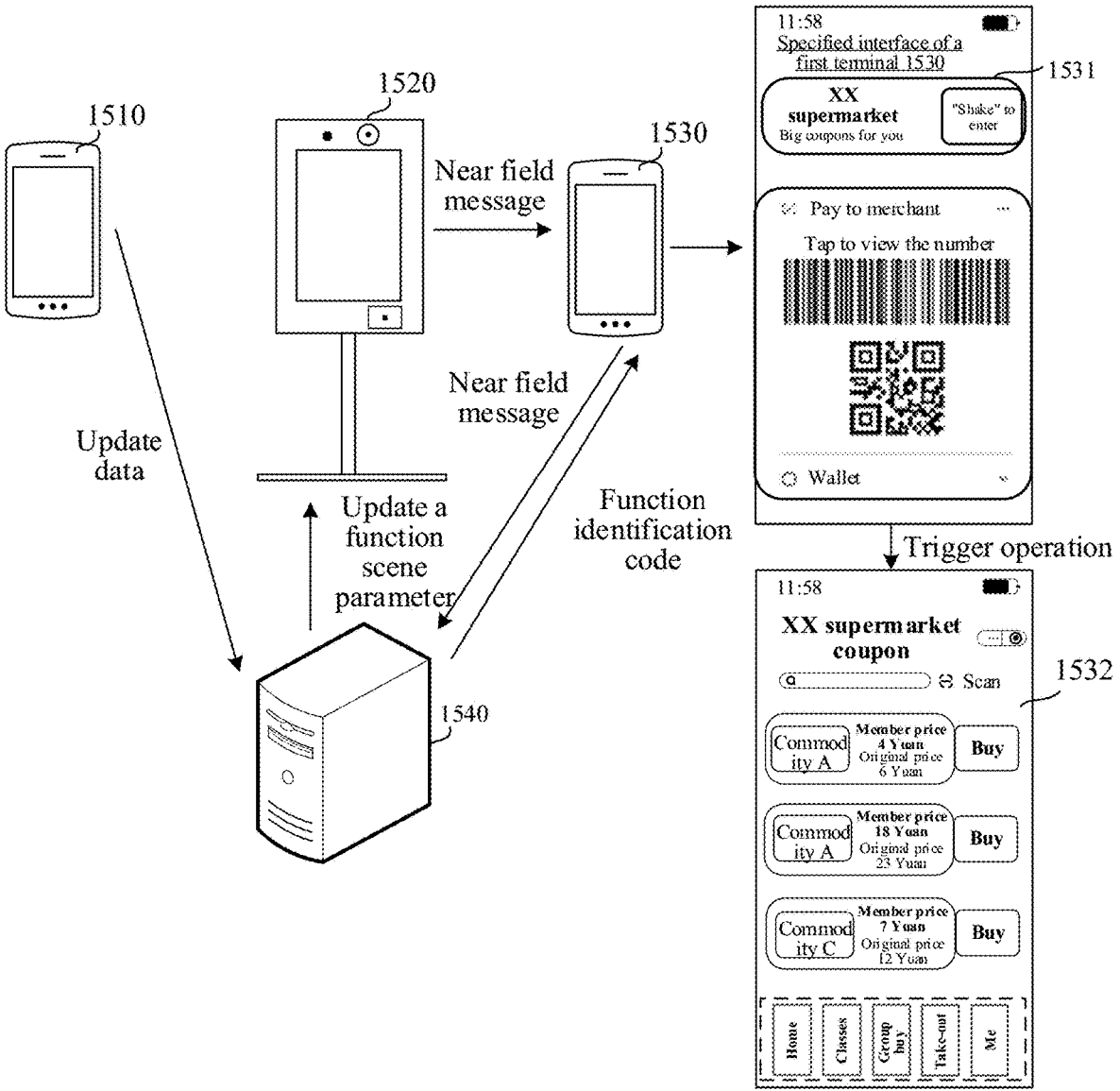
FIG. 15 is a schematic diagram of a process of a program function triggering method according to an embodiment of this application.

Schematically, refer to FIG. 15. FIG. 15 is a schematic diagram of a process of the program function triggering method according to an embodiment of this application. As shown in FIG. 15, after update configuration is performed on a function scene parameter of a function device 1520 through a second terminal 1510 (the second terminal 1510 transmits update data to a server 1540, and after receiving the update data, the server 1540 transmits an updated function scene parameter to the function device 1520), the function device 1520 transmits a near field message to a first terminal 1530 within the NFC range. The near field message includes the latest function identification code. After receiving the function identification code, the first terminal 1530 transmits the function identification code to the server 1540, and receives a function scene parameter fed back by the server 1540 based on the function identification code, including the display parameter corresponding to the triggering prompt information. The triggering prompt information 1531 is displayed on the specified interface of the target application program in the first terminal 1530. After the first terminal 1530 receives the trigger operation, a function interface 1532 of the target application program is displayed (a process in which the function device 1520 obtains the function identification code for the first time is not shown in the figure).

In summary, according to the program function triggering method provided in this embodiment of this application, when the distance between the terminal and the function device is within the NFC range, the terminal may receive the near field message broadcast by the function device, and display the triggering prompt information. The triggering prompt information is used for providing a channel for the terminal to enter the function interface. When the terminal receives the trigger operation on the triggering prompt information, the function interface of the target application program is displayed. The content of the program function is displayed on the function interface. Displaying the function interface on the terminal by performing the trigger operation on the triggering prompt information displayed on the terminal simplifies the operating process of displaying the function interface, and improves the feasibility of the program function triggering method and convenience in the trigger operation.

Figure 16:
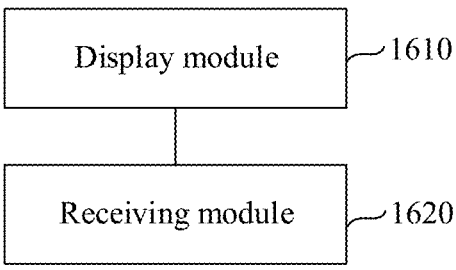
FIG. 16 is a block diagram of a structure of a program function triggering apparatus according to another embodiment of this application.
Figure 17:
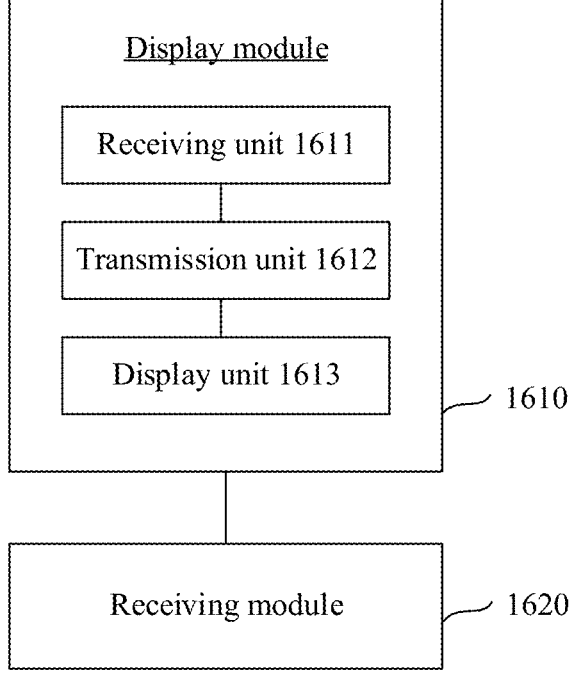
FIG. 17 is a block diagram of a structure of a program function triggering apparatus according to another embodiment of this application.

FIG. 16 is a block diagram of a structure of a program function triggering apparatus according to an embodiment of this application. As shown in FIG. 16, the apparatus includes:

a display module 1610, configured to display triggering prompt information, the triggering prompt information being information displayed after a near field message transmitted by a function device is received when a distance between a terminal and the function device is within an NFC range, and a target application program being installed in the terminal; and a receiving module 1620, configured to receive a trigger operation on the triggering prompt information, the triggering prompt information being used for triggering a program function that is in the target application program and that is related to the function device.

The display module 1610 is further configured to display a function interface of the target application program based on the trigger operation. The function interface is used for displaying content of the program function.

In one embodiment, the display module 1610 is further configured to display a specified interface in the target application program, the specified interface being a preset interface related to the function device, and display the triggering prompt information on the specified interface in response to that the distance between the terminal and the function device is within the NFC range.

In one embodiment, the function device includes a cash register.

The display module 1610 is further configured to display a resource transfer interface in the target application program. The resource transfer interface is used for resource collection or payment.

In one embodiment, the receiving module 1620 is further configured to receive a tap operation on the triggering prompt information as the trigger operation.

Alternatively, the receiving module 1620 is further configured to display a triggering prompt message, the triggering prompt message being used for indicating a specified terminal control operation for triggering the triggering prompt information, receive a motion control operation on the terminal, and determine the motion control operation as the trigger operation in response to that the motion control operation matches the specified terminal control operation.

In one embodiment, the display module 1610 includes:

a receiving unit 1611, configured to receive the near field message transmitted by the function device, the near field message including a function identification code corresponding to the function device;

a transmission unit 1612, configured to transmit the function identification code to a server;

the receiving unit 1611 being further configured to receive a function scene parameter fed back by the server based on the function identification code, the function scene parameter including a display parameter corresponding to the triggering prompt information; and a display unit 1613, configured to display the triggering prompt information based on the display parameter.

In one embodiment, the display parameter includes prompt content in the triggering prompt information. The prompt content is content set by an administrator account corresponding to the function device.

The display unit 1613 is further configured to display the prompt content in the triggering prompt information based on the display parameter.

In one embodiment, the function scene parameter includes a sub-application path parameter corresponding to the function device.

The display module 1610 is further configured to display the function interface in a target sub-application based on the sub-application path parameter and the trigger operation. The target sub-application is a sub-application running with the target application program as a host program.

In one embodiment, the function device is a cash register corresponding to a first store, and the target sub-application corresponds to the first store.

The display module 1610 is further configured to display a store activity interface in the target sub-application based on the trigger operation. The store activity interface includes activity information of the first store.

Alternatively, the display module 1610 is further configured to display a cash collection interface in the target sub-application based on the trigger operation. The cash collection interface includes a graphic identification code for resource exchange. The graphic identification code is used for the cash register to scan to implement a cash collection process.

In one embodiment, the function device is an ordering device corresponding to a second store, and the target sub-application corresponds to the second store.

The display module 1610 is further configured to display an ordering interface in the target sub-application based on the trigger operation. The ordering interface includes candidate merchandise information provided by the second store.

In one embodiment, the function device is a rental device corresponding to a third store, and the target sub-application corresponds to the third store.

The display module 1610 is further configured to display a rental interface in the target sub-application based on the trigger operation. The rental interface includes information for candidate to-be-rented objects provided by the third store.

In summary, according to the program function triggering method provided in this embodiment of this application, when the distance between the terminal and the function device is within the NFC range, the terminal may receive the near field message broadcast by the function device, and display the triggering prompt information. The triggering prompt information is used for providing a channel for the terminal to enter the function interface. When the terminal receives the trigger operation on the triggering prompt information, the function interface of the target application program is displayed. The content of the program function is displayed on the function interface. Displaying the function interface on the terminal by performing the trigger operation on the triggering prompt information displayed on the terminal simplifies an operating process of displaying the function interface, and improves feasibility of a program function triggering method and convenience in the trigger operation.

The division of the functional modules of the program function triggering apparatus provided in the foregoing embodiment is used merely as an example for description. In some embodiments, depending on a requirement, the functions may be allocated to different functional modules for implementation, that is, an internal structure of the apparatus is divided into different functional modules to implement all or some of the functions described above. In addition, the program function triggering apparatus provided in the embodiment belongs to the same concept as the embodiment of the program function triggering method, and details about a specific implementation process of the apparatus refer to the method embodiment, and will not be elaborated herein.

Figure 18:
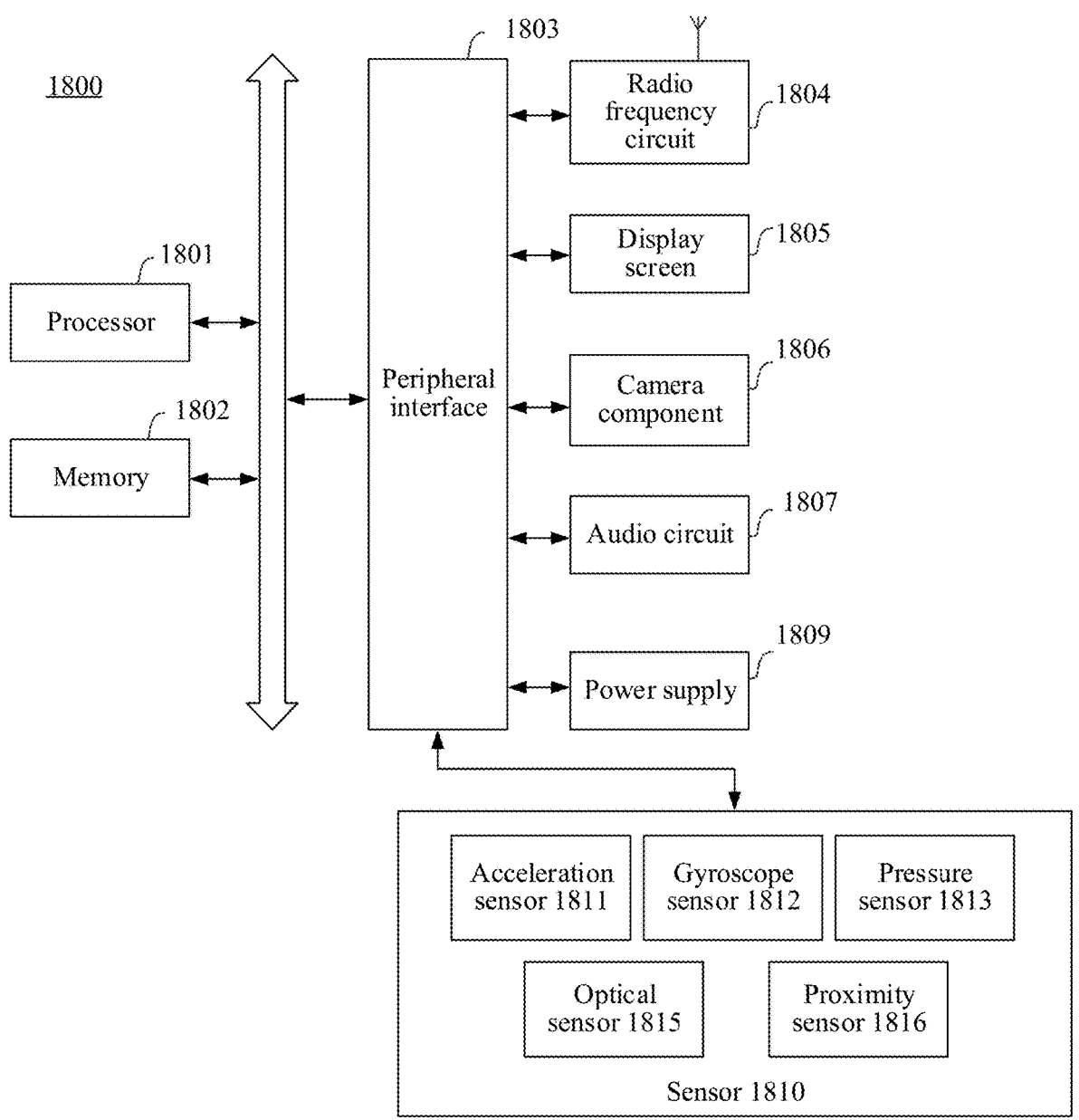
FIG. 18 is a block diagram of a structure of a terminal according to an embodiment of this application.

FIG. 18 is a block diagram of a structure of an electronic device 1800 according to an embodiment of this application. The electronic device 1800 may be a portable mobile terminal, for example, a smartphone, an in-vehicle terminal, a tablet computer, a moving picture experts group audio layer III (MP3) player, a moving picture experts group audio layer IV (MP4) player, a notebook computer, or a desktop computer. The electronic device 1800 may also be referred to as user equipment, a portable terminal, a laptop terminal, a desktop terminal, or another name.

The electronic device 1800 generally includes a processor 1801 and a memory 1802.

The memory 1802 may include one or more computer-readable storage media. The computer-readable storage medium may be non-transitory. Memory 1802 may further include a high-speed random access memory (RAM) and a nonvolatile memory, for example, one or more disk storage devices or flash storage devices. In some embodiments, the non-transitory computer-readable storage medium in memory 1802 is configured to store at least one instruction. The at least one instruction is used to be executed by the processor 1801 to implement the program function triggering method provided in the method embodiment in this application.

In some embodiments, the electronic device 1800 in some embodiment further includes a peripheral interface 1803 and at least one peripheral. The processor 1801, the memory 1802, and the peripheral interface 1803 may be connected through a bus or a signal cable. Each peripheral may be connected to the peripheral interface 1803 through the bus, the signal cable, or a circuit board. Specifically, the peripheral includes at least one of a radio frequency circuit 1804, a display screen 1805, a camera component 1806, an audio circuit 1807, and a power supply 1809.

In some embodiments, the electronic device 1800 further includes one or more sensors 1810. The one or more sensors 1810 include but are not limited to an acceleration sensor 1811, a gyroscope sensor 1812, a pressure sensor 1813, an optical sensor 1815, and a proximity sensor 1816.

It may be understood by a person skilled in the art that the structure shown in FIG. 18 does not form a limitation on the electronic device 1800. More or fewer components than those shown in the figure may be included, or some components are combined, or different component arrangements are used.

An embodiment of this application also provides a computer device. The computer device may be implemented as the terminal or server shown in FIG. 2. The computer device includes a processor and a memory. The memory stores at least one instruction, at least one piece of program, a code set, or an instruction set. The at least one instruction, the at least one piece of program, the code set, or the instruction set is loaded and executed by the processor to implement the program function triggering method provided in each of the foregoing method embodiments.

An embodiment of this application also provides a computer-readable storage medium. The computer-readable storage medium stores at least one instruction, at least one piece of program, code set, or instruction set. The at least one instruction, the at least one piece of program, the code set, or the instruction set is loaded and executed by a processor to implement the program function triggering method provided in each of the foregoing method embodiments.

In some embodiment, the computer-readable storage medium may include a read only memory (ROM), a RAM, a solid state drive (SSD), an optical disk, or the like. The RAM may include a resistance random access memory (ReRAM) and a dynamic random access memory (DRAM). The sequence numbers of the embodiments of this application are only for description and do not represent superiority-inferiority of the embodiments.

An embodiment of this application also provides a computer program product or computer program. The computer program product or computer program includes computer instructions. The computer instructions are stored in a computer-readable storage medium. A processor of a computer device reads the computer instructions from the computer-readable storage medium. The processor executes the computer instructions to enable the computer device to perform any program function triggering method in the embodiments.

What is claimed is:

1. A program function triggering method, the method being performed by a terminal, and the method comprising:
   displaying a specified interface in a target application program executed by the terminal, the specified interface comprising a resource transfer region configured to transfer resources;
   displaying, in response to a distance between the terminal and a function device being within a near field communication (NFC) range and after a near field message transmitted by the function device is received by the terminal, triggering prompt information together with the resource transfer region on the specified interface;
   receiving a trigger operation on the triggering prompt information, the triggering prompt information triggering a program function that is in the target application program and that is related to the function device; and
   displaying a function interface of the target application program based on the trigger operation, the function interface displaying content of the program function.

2. The method according to claim 1, wherein the function device comprises a cash register.

3. The method according to claim 1, wherein the receiving a trigger operation on the triggering prompt information comprises:
   receiving a tap operation on the triggering prompt information as the trigger operation;
   or
   displaying a triggering prompt message, the triggering prompt message indicating a specified terminal control operation for triggering the triggering prompt information, receiving a motion control operation on the terminal, and determining the motion control operation as the trigger operation in response to that the motion control operation matches the specified terminal control operation.

4. The method according to claim 1, wherein the displaying triggering prompt information comprises:
   receiving the near field message transmitted by the function device, the near field message comprising a function identification code corresponding to the function device;
   transmitting the function identification code to a server;

receiving a function scene parameter sent back by the server based on the function identification code, the function scene parameter comprising a display parameter corresponding to the triggering prompt information; and displaying the triggering prompt information based on the display parameter.

5. The method according to claim 4, wherein the display parameter comprises prompt content in the triggering prompt information, and the prompt content is content set by an administrator account corresponding to the function device; and the displaying the triggering prompt information based on the display parameter comprises:

displaying the prompt content in the triggering prompt information based on the display parameter.

6. The method according to claim 4, wherein the function scene parameter comprises a sub-application path parameter corresponding to the function device; and the displaying a function interface of the target application program based on the trigger operation comprises:

displaying the function interface in a target sub-application based on the sub-application path parameter and the trigger operation, the target sub-application being a sub-application running with the target application program as a host program.

7. The method according to claim 6, wherein the function device is a cash register corresponding to a first store, and the target sub-application corresponds to the first store; and the displaying the function interface in a target sub-application based on the trigger operation comprises:

displaying a store activity interface in the target sub-application based on the trigger operation, the store activity interface comprising activity information of the first store;

or displaying a cash collection interface in the target sub-application based on the trigger operation, the cash collection interface comprising a graphic identification code for resource exchange, and the graphic identification code being used for the cash register to implement a cash collection process.

8. The method according to claim 6, wherein the function device is an ordering device corresponding to a second store, and the target sub-application corresponds to the second store; and the displaying the function interface in a target sub-application based on the trigger operation comprises:

displaying an ordering interface in the target sub-application based on the trigger operation, the ordering interface comprising candidate merchandise information provided by the second store.

9. The method according to claim 6, wherein the function device is a rental device corresponding to a third store, and the target sub-application corresponds to the third store; and the displaying the function interface in a target sub-application based on the trigger operation comprises:

displaying a rental interface in the target sub-application based on the trigger operation, the rental interface comprising information for candidate objects provided by the third store.

10. A program function triggering system, the system comprising a function device and a first terminal, a target application program being installed in the first terminal;

the function device being configured to broadcast a near field message, the near field message comprising a function identification code corresponding to the function device; and the first terminal being configured to:

display a specified interface in the target application program, the specified interface comprising a resource transfer region configured to transfer resources, in response to a distance between the first terminal and the function device being within a near field communication (NFC) range and after the near field message transmitted by the function device is received by the first terminal, display, together with the resource transfer region on the specified interface, triggering prompt information based on the function identification code in the near field message, receive a trigger operation on the triggering prompt information, and display a function interface of the target application program based on the trigger operation, the function interface displaying content of the program function.

11. The system according to claim 10, wherein the system further comprises a server;

the first terminal is further configured to transmit the function identification code to the server;

the server is configured to obtain a function scene parameter corresponding to the function identification code, and send back the function scene parameter to the first terminal, the function scene parameter comprising a display parameter corresponding to the triggering prompt information; and the first terminal is further configured to receive the function scene parameter, and display the triggering prompt information based on the display parameter.

12. The system according to claim 11, wherein the system further comprises a second terminal;

the second terminal is configured to transmit update data to the server, the update data comprising the function identification code and an update configuration parameter; and the server is configured to receive the update data, obtain the function scene parameter corresponding to the function identification code, and update configuration on the function scene parameter based on the update configuration parameter.

13. A non-transitory computer-readable storage medium, the storage medium storing at least one instruction, and the at least one instruction being loaded and executed by one or more processors of a terminal to implement:

displaying a specified interface in a target application program executed by the terminal, the specified interface comprising a resource transfer region configured to transfer resources;

displaying, in response to a distance between the terminal and a function device being within a near field communication (NFC) range and after a near field message transmitted by the function device is received by the terminal, triggering prompt information together with the resource transfer region on the specified interface;

receiving a trigger operation on the triggering prompt information, the triggering prompt information triggering a program function that is in the target application program and that is related to the function device; and displaying a function interface of the target application program based on the trigger operation, the function interface displaying content of the program function.

14. The computer-readable storage medium according to claim 13, wherein the function device comprises a cash register.

15. The computer-readable storage medium according to claim 13, wherein the receiving a trigger operation on the triggering prompt information comprises:

receiving a tap operation on the triggering prompt information as the trigger operation;

or displaying a triggering prompt message, the triggering prompt message indicating a specified terminal control operation for triggering the triggering prompt information, receiving a motion control operation on the terminal, and determining the motion control operation as the trigger operation in response to that the motion control operation matches the specified terminal control operation.

16. The computer-readable storage medium according to claim 13, wherein the displaying triggering prompt information comprises:

receiving the near field message transmitted by the function device, the near field message comprising a function identification code corresponding to the function device;

transmitting the function identification code to a server;

receiving a function scene parameter sent back by the server based on the function identification code, the function scene parameter comprising a display parameter corresponding to the triggering prompt information; and displaying the triggering prompt information based on the display parameter.

17. The computer-readable storage medium according to claim 16, wherein the display parameter comprises prompt content in the triggering prompt information, and the prompt content is content set by an administrator account corresponding to the function device; and the displaying the triggering prompt information based on the display parameter comprises:

displaying the prompt content in the triggering prompt information based on the display parameter.

18. The computer-readable storage medium according to claim 16, wherein the function scene parameter comprises a sub-application path parameter corresponding to the function device; and the displaying a function interface of the target application program based on the trigger operation comprises:

displaying the function interface in a target sub-application based on the sub-application path parameter and the trigger operation, the target sub-application being a sub-application running with the target application program as a host program.

19. The method according to claim 1, wherein the resource transfer region includes a graphical code carrying identity information of the terminal and supporting a resource transfer behavior.

20. The method according to claim 1, wherein the function device is one of a resource collection device of a merchant, an ordering device, a rental device, an entrance access control device.

* * * * *